US011272375B2

(12) United States Patent
Sahoo et al.

(10) Patent No.: US 11,272,375 B2
(45) Date of Patent: Mar. 8, 2022

(54) DYNAMIC PHYSICAL RESOURCE BLOCK CONTROL APPARATUS AND PROCESS FOR DYNAMICALLY CONTROLLING ALLOCATION OF A PHYSICAL RESOURCE BLOCK

(71) Applicant: Government of the United States of America, as represented by the Secretary of Commerce, Gaithersburg, MD (US)

(72) Inventors: Anirudha Sahoo, North Potomac, MD (US); Timothy Alan Hall, Gaithersburg, MD (US); Robert Charles Hagwood, Washington, DC (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 33 days.

(21) Appl. No.: 16/841,106

(22) Filed: Apr. 6, 2020

(65) Prior Publication Data
US 2020/0329382 A1    Oct. 15, 2020

Related U.S. Application Data

(60) Provisional application No. 62/833,997, filed on Apr. 15, 2019.

(51) Int. Cl.
*H04W 16/14* (2009.01)
*H04W 16/10* (2009.01)
(Continued)

(52) U.S. Cl.
CPC .......... *H04W 16/14* (2013.01); *H04L 5/0094* (2013.01); *H04W 16/10* (2013.01); *H04W 24/02* (2013.01);
(Continued)

(58) Field of Classification Search
CPC ..... H04W 16/14; H04W 16/10; H04W 24/02; H04W 28/16; H04W 72/0453; H04L 5/0094
See application file for complete search history.

(56) References Cited

U.S. PATENT DOCUMENTS 8,463,188 B2    6/2013  Gan et al.
2017/0135003 A1*  5/2017  Suarez .................. H04W 36/22
(Continued)

OTHER PUBLICATIONS

Sharma, M., et al., "Stochastic Model Based Opportunistic Channel Access in Dynamic Spectrum Access Networks", IEEE Transactions of Mobile Computing, 2014, p. 1625-1639, vol. 13 No. 7.
(Continued)

*Primary Examiner* — Joshua L Schwartz
(74) *Attorney, Agent, or Firm* — Office of Chief Counsel for National Institute of Standards and Technology

(57) ABSTRACT

A dynamic physical resource block control apparatus dynamically controls allocation of a physical resource block and includes: a dynamic spectrum arbitrage controller in communication with LTE wireless channels and a secondary user, the dynamic spectrum arbitrage controller: produces a status request to the LTE wireless channels, receives channel status response from the LTE wireless channels in response to the channel status request; receives a PRB allocation request from the secondary user; and produces a PRB map in response to the PRB allocation request; and LTE wireless channels in communication with a primary user and the secondary user and that: communicates a PRB map to the
(Continued)

primary user; receives primary user data from the primary user; receives secondary user data from the secondary user.

3 Claims, 22 Drawing Sheets

(51) Int. Cl.
*H04W 24/02* (2009.01)
*H04W 28/16* (2009.01)
*H04L 5/00* (2006.01)
*H04W 72/04* (2009.01)

(52) U.S. Cl.
CPC ....... *H04W 28/16* (2013.01); *H04W 72/0453* (2013.01)

(56) References Cited

U.S. PATENT DOCUMENTS

2017/0295497 A1* 10/2017 MacMullan .......... H04W 24/02
2021/0100023 A1* 4/2021 Wei ....................... H04W 72/14

OTHER PUBLICATIONS

Geirhofer, S., et al., Dynamic Spectrum Access in WLAN Channels: Empirical Model and It's Stochastic Analysis, TAPAS, 2006.
Zhao, Q., et al., "Decentralized Cognitive MAC for Opportunistic Spectrum Access in Ad Hoc Networks: A POMDP Framework", IEEE Journal on Selected Areas in Communications, 2007, p. 589-600, vol. 25 No. 3.
Sung, K.W., et al., "Temporal Spectrum Sharing Based on Primary User Activity Prediction", IEEE Transactions on Wireless Communications, 2010, p. 3848-3855, vol. 9 No. 12.
Plummer Jr., A., et al., "Measurement-Based Bandwidth Scavenging in Wireless Networks", IEEE Transactions on Mobile Computing, 2012, p. 19-32, vol. 11 No. 1.
Huang, P., et al., "Wireless Spectrum Occupancy Prediction Based on Partial Periodic Pattern Mining", IEEE Transactions on Parallel and Distributed Systems, 2014, p. 1925-1934, vol. 25 No. 7.
Kim, H., et al., "Efficient Discovery of Spectrum Opportunities with MAC-Layer Sensing in Cognitive Radio Networks", 2008, p. 533-545, vol. 7 No. 5.
Hall, T., et al.,"Dynamic Spectrum Access Algorithms Based on Survival Analysis", IEEE Transactions on Cognitive Communications and Networking, 2017, p. 740-751, vol. 3 No. 4.

* cited by examiner

Algorithm Fixed_PRB : Request Grant of $\mathcal{W}$ PRBs input:
$\mathcal{W}$ = number of PRBs requested
parameters:
$\mathbf{H} = \{H_n^1, H_n^2, \ldots H_n^N\}$: non-parametric estimate of cumulative hazard function for channels 1 to $N$
$\mathbf{t} = \{t_1, t_2, \ldots t_N\}$: length of current idle period for channels 1 to $N$ in terms of PRBs
$p$ - the probability of successful transmission threshold
output:
$\mathbf{x} = \{x_1, x_2, \ldots x_N\}$: number of resource blocks allocated in channels 1 to $N$ $\theta_{th} := -\ln p$
$\theta := 0$
$\mathbf{x} := \mathbf{0}$
while $\sum_i x_i \leq \mathcal{W}$ do
    $\theta_{min} = \min_i H_n^i(t_i + x_i + 1) - H_n^i(t_i)$
    $i_{min} = \text{argmin}_i H_n^i(t_i + x_i + 1) - H_n^i(t_i)$
    if $\theta_{min} \leq \theta_{th}$ then
        $x_{i_{min}} = x_{i_{min}} + 1$
        $\theta = \theta_{min}$
    else
        break
    end if
end while
return $\mathbf{x}$

FIG. 5

| chan num | lab (1st day) | | lab (2nd day) | | upenn01 | | upenn02 | |
|---|---|---|---|---|---|---|---|---|
| | % Idle duration | max Idle duration (ms) | % Idle duration | max Idle duration (ms) | % Idle duration | max Idle duration (ms) | % Idle duration | max Idle duration (ms) |
| 15 | 95.8 | 43431 | 92.3 | 28892 | 90.6 | 170 | 89.4 | 127 |
| 16 | 95.4 | 43471 | 92.1 | 28892 | 90.8 | 184 | 89.9 | 132 |
| 17 | 95.6 | 43432 | 92.4 | 28935 | 91.0 | 163 | 89.2 | 154 |
| 18 | 95.8 | 35345 | 92.7 | 28980 | 90.8 | 191 | 87.8 | 106 |
| 19 | 95.7 | 44151 | 92.8 | 28980 | 89.8 | 166 | 82.0 | 68 |
| 20 | 95.6 | 51532 | 92.8 | 28980 | 88.9 | 149 | 77.8 | 63 |
| 21 | 95.9 | 51532 | 92.9 | 28980 | 88.7 | 142 | 77.0 | 66 |
| 22 | 96.0 | 49255 | 93.1 | 19401 | 89.8 | 136 | 57.2 | 34 |
| 23 | 95.9 | 51529 | 93.1 | 31681 | 90.3 | 155 | 70.6 | 36 |
| 24 | 95.8 | 51529 | 93.2 | 30841 | 90.3 | 142 | 83.4 | 79 |

TABLE I

IDLE TIME DURATION INFORMATION FOR THE DATASETS

FIG. 16

DYNAMIC PHYSICAL RESOURCE BLOCK CONTROL APPARATUS AND PROCESS FOR DYNAMICALLY CONTROLLING ALLOCATION OF A PHYSICAL RESOURCE BLOCK

CROSS REFERENCE TO RELATED APPLICATIONS

The application claims priority to U.S. Provisional Patent Application Ser. No. 62/833,997 filed Apr. 15, 2019, the disclosures of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301)-975-2573; email tpo@nist.gov.

BRIEF DESCRIPTION

Disclosed is a dynamic physical resource block control apparatus for dynamically controlling allocation of a physical resource block (PRB), the dynamic physical resource block control apparatus comprising: a dynamic spectrum arbitrage controller in communication with LTE wireless channels and a secondary user, the dynamic spectrum arbitrage controller: sends a channel status request to the LTE wireless channels; receives a channel status response from the LTE wireless channels; receives a PRB allocation request from the secondary user; and produces a PRB map in response to the PRB allocation request; communicates a PRB map to the primary user; LTE wireless channels in communication with a primary user and the secondary user and that: receives primary user data from the primary user; receives secondary user data from the secondary user.

Disclosed is a process for dynamically controlling allocation of physical resource blocks with a dynamic physical resource block control apparatus, the process comprising: receiving a PRB map by the primary user from the LTE wireless channels; sending, by the primary user, primary user data over the LTE wireless channels in accordance with the PRB map; sending, by the secondary user, the PRB allocation request to the dynamic spectrum arbitrage controller when the secondary user has secondary user data to send; sending, by the dynamic spectrum arbitrage controller, a status request to the LTE wireless channels; sending, by the LTE wireless channels, a channel status response to the dynamic spectrum arbitrage controller, the channel status response comprising which of the LTE wireless channels are busy and which of the LTE wireless channels are idle; performing, by the dynamic spectrum arbitrage controller, a process for optimal dynamic spectrum arbitrage after receiving the channel status response from the LTE wireless channels and in response to receiving the PRB allocation request from the secondary user; producing, by the dynamic spectrum arbitrage controller, the PRB map from performing the process for optimal dynamic spectrum arbitrage returning, by the dynamic spectrum arbitrage controller, the PRB map to the secondary user in response to the PRB allocation request; and transmitting, by the secondary user, secondary user data over the LTE wireless channels in accordance with the PRB map from the dynamic spectrum arbitrage controller to dynamically control allocation of physical resource blocks with the dynamic physical resource block control apparatus.

BRIEF DESCRIPTION OF THE DRAWINGS

The following description cannot be considered limiting in any way. With reference to the accompanying drawings, like elements are numbered alike.

FIG. 5 shows a process for finding an optimal allocation of resource blocks;

FIG. 16 shows the idle time duration information for the datasets;

DETAILED DESCRIPTION

Figure 1:
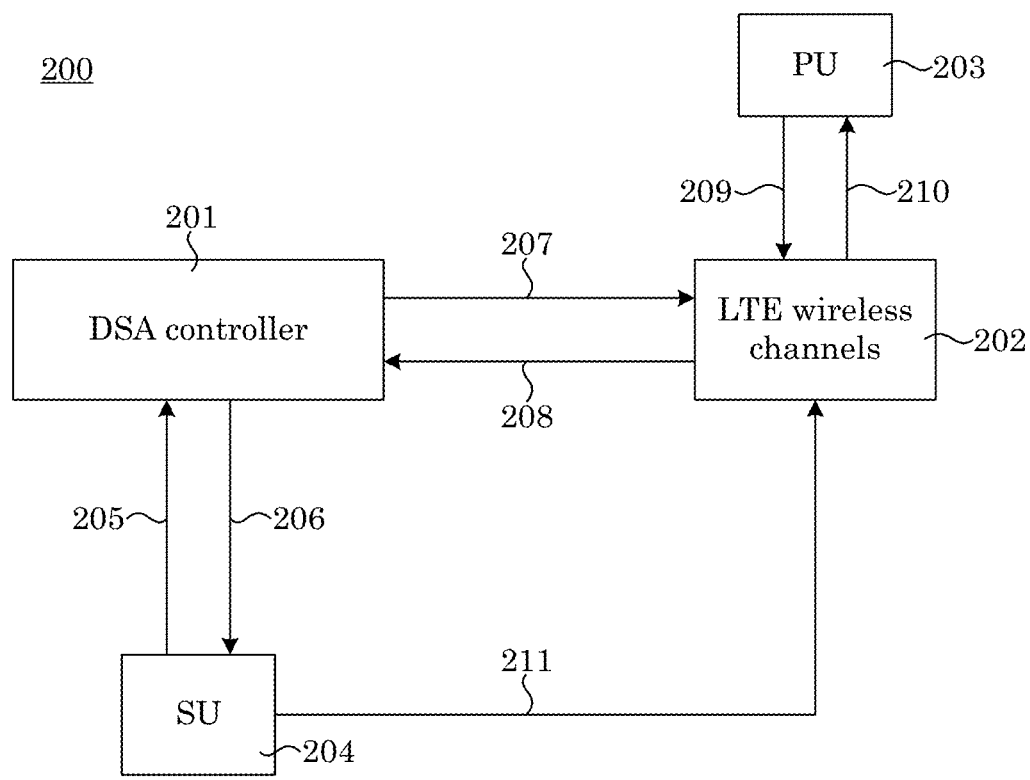
FIG. 1 shows a dynamic physical resource block control apparatus.

A detailed description of one or more embodiments is presented herein by way of exemplification and not limitation.

It has been discovered a dynamic physical resource block control apparatus, dynamic spectrum arbitrage controller, process for controlling dynamic spectrum arbitrage, and a process for optimal dynamic spectrum arbitrage provide optimal dynamic spectrum access (DSA) by a secondary user (SU) in a primary user (PU) long term evolution (LTE) network. A cumulative hazard function from survival analysis determines a probability of an SU successfully transmitting over a certain number of physical resource blocks (PRBs) after the SU request arrives during an idle period, and then the SU request for transmission is granted if the above probability is more than a set threshold. Advantageously, the dynamic spectrum arbitrage controller and processes herein optimally allocate PRBs from a set of idle LTE channels such that the probability of interference to the PU on each channel is less than a set threshold while the number of PRBs assigned to the SU is maximized.

Dynamic physical resource block control apparatus 200 dynamically controls allocation of a physical resource block. In an embodiment, with reference to FIG. 1, FIG. 2, FIG. 3, and FIG. 4, dynamic physical resource block control apparatus 200 includes dynamic physical resource block control apparatus 200 for dynamically controlling allocation of a physical resource block, dynamic physical resource block control apparatus 200 including: dynamic spectrum arbitrage controller 201 in communication with LTE wireless channels 202 and secondary user 204, dynamic spectrum arbitrage controller 201: sends status request 207; receives channel status response 208 in response to status request 207 from LTE wireless channels 202; receives PRB allocation request 205 from secondary user 204; and produces PRB map 206 in response to PRB allocation request 205; and LTE wireless channels 202 in communication with primary user 203 and secondary user 204 and that: communicates PRB map 210 to primary user 203; receives primary user data 209 from primary user 203; receives secondary user data 211 from secondary user 204.

Figure 2:
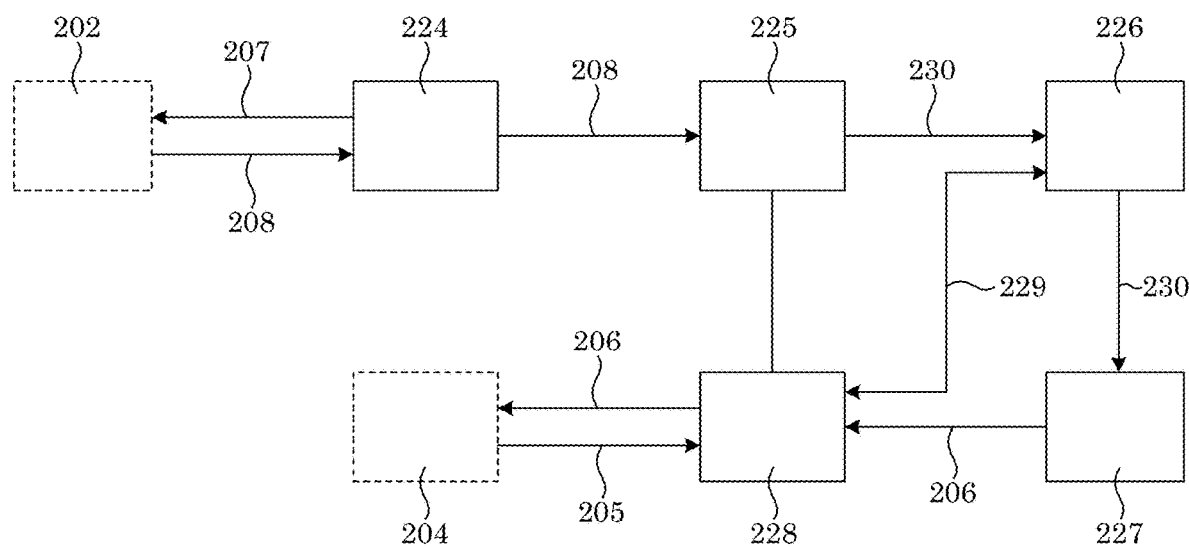
FIG. 2 shows a dynamic spectrum arbitrage controller for a dynamic physical resource block control apparatus.

In an embodiment, with reference to FIG. 2, dynamic spectrum arbitrage controller 201 includes: occupancy query engine 224 in communication with LTE wireless channels 202 and hazard function determiner 225 and that produces status request 207, communicates status request 207 to LTE wireless channels 202, receives channel status response 208 from LTE wireless channels 202, and communicates channel status response 208 to hazard function determiner 225; hazard function determiner 225 in communication with timer 226 and that receives channel status response 208 from occupancy query engine 224 and produces non-parametric cumulative hazard function 230; timer 226 in communication with control communicator 228 and that receives non-parametric cumulative hazard function 230 from hazard function determiner 225, receives request receive signal 229 from control communicator 228, and communicates non-parametric cumulative hazard function 230 to PRB mapper 227 in response to receipt of request receive signal 229 from control communicator 228; PRB mapper 227 in communication with timer 226 and that receives non-parametric cumulative hazard function 230 from timer 226, produces PRB map 206 based on non-parametric cumulative hazard function 230, and communicates PRB map 206 to control communicator 228; and control communicator 228 in communication with PRB mapper 227 and that receives PRB allocation request 205 from secondary user 204, produces request receive signal 229 and communicates request receive signal 229 to timer 226 in response to receiving PRB allocation request 205 from secondary user 204, receives PRB map 206 from PRB mapper 227, and communicates PRB map 206 to secondary user 204 in response to receiving PRB allocation request 205 from secondary user 204.

It is contemplated that dynamic physical resource block control apparatus 200 provides secondary user 204 with optimal use of idle PRBs in a primary user long term evolution (PULTE) network for transmission by secondary user 204. Here, dynamic physical resource block control apparatus 200 uses a non-parametric estimation of cumulative hazard function 230 using survival analysis to compute a probability of successful transmission of secondary user 204 in a PRB. Using this information an optimal PRB allocation is provided by dynamic physical resource block control apparatus 200, wherein secondary user 204 maximizes the number of PRBs secondary user 204 can use to transmit while keeping the probability of successful transmission greater than a set threshold on each of the LTE wireless channels 202 or keeping the probability of interference to primary user 203 less than a set threshold. Beneficially, dynamic physical resource block control apparatus 200 operates in an absence of changes to the PULTE system. Thus, it can be implemented in an SU system transparent to the PULTE.

Dynamic spectrum arbitrage controller 201 receives PRB allocation request 205 and channel status response 208 and communicates PRB map 206 and channel status request 207. With regard to dynamic spectrum arbitrage controller 201, occupancy query engine 224 sends channel status request 207 and receives channel status response 208 from LTE wireless channels 202.

Status request 207 seeks to obtain channel status (busy or idle) of all the LTE wireless channels 202. An embodiment of status request is a message that includes channel ids for which status is sought or a special code indicating that status of all the channels are sought.

Channel status response 208 includes the status of each LTE channel. In an embodiment channel status response 208 can be a bitmap whose length is equal to the number of LTE wireless channels. A zero in the bitmap indicates the channel to be idle and a one indicates the channel to be busy.

Occupancy query engine 224 obtains a status of LTE wireless channels 202 and includes a sensing element that senses LTE wireless channels 202. In an embodiment, the sensing element operates by energy sensing. When energy on a given channel is above a noise threshold, the occupancy query engine considers the channel as busy, otherwise it is idle.

Hazard function determiner 225 computes non-parametric cumulative hazard function of idle times of LTE wireless channels using the theory of survival analysis. In an embodiment, hazard function determiner 225 can be a hardware or software module that computes the non-parametric cumulative hazard function.

Timer 226 waits for request receive signal 229 from control communicator 228. Upon receiving the request receive signal, it dispatches non-parametric cumulative hazard function to the PRB mapper 227.

PRB mapper 227 computes PRB map 206. It receives the non-parametric cumulative hazard function 230 from timer 226 and computes the PRB map using the dynamic spectrum arbitrage 218. This functionality can be implemented either in hardware or in software.

Control communicator 228 is an interface to the dynamic spectrum arbitrage controller for the SU 204. Upon receiving PRB allocation request 205 from SU 204. Further, control communicator 228 send request receive signal 229 to timer 226. When it receives PRB map 206 from the PRB mapper 227, it dispatches the PRB map 206 to the SU 204.

In an embodiment, control communicator 228 includes communication hardware with interfaces to send and receive messages from SU 204, send hardware or software interrupt to timer 226 and to receive PRB map from PRB mapper 227.

Request receive signal 229 is a signal or request to the timer 226 to start the PRB map computation process. In an embodiment, request receive signal 229 is a hardware interrupt to the timer. In another embodiment, request receive signal 229 is delivered to timer 226 as a software event.

Non-parametric cumulative hazard function 230 specifies an estimate of the cumulative hazard function of idle times of LTE wireless channels 202. It could be represented as a curve or as a table showing the value of cumulative hazard function at different idle time durations.

Secondary user 204 is a lower priority user in the system that opportunistically uses the idle PRBs in the PULTE system. Exemplary components of secondary user 204 may include a user equipment hardware, a set of communication hardware and firmware running the optimal dynamic physical resource block allocation method.

PRB allocation request 205 is a message sent by the SU 204 to the dynamic spectrum arbitrage controller to optimally allocate idle PRBs from PULTE such that the probability of interference to the PU is below a set threshold. This message may be implemented in the SU hardware or in the firmware.

PRB map 206 is a two dimensional map that shows which PRBs from each LTE wireless channels 202 has been allocated to the SU 204 for its data transmission. The two dimensions in the PRB map are time and frequency (or channel). PRB map 206 can be implemented in hardware or software.

Secondary user data 211 is the data intended to be transmitted by the SU 204 once it gets idle PRB map 206 from the DSA controller 201. Some exemplary secondary user data are data sent by smart meters and delay tolerant applications.

LTE wireless channels 202 are the wireless channels used by PU 203 to transmit its data 209 using radio frequency with higher priority. It is also used by SU 204 to transmit its data 211 opportunistically using radio frequency. The wireless spectrum licensed to primary user 203 is divided into a number equal sized channels. In an embodiment, each channel is a range of frequencies.

Primary user 203 is the wireless device which has the higher priority to use the LTE wireless channels 202. Exemplary components of primary user 203 include user equipment hardware such as a phone or tablet, a set of networked computer, and communication hardware. In an embodiment, primary user 203 is a mobile phone or a LTE hotspot.

Primary user data 209 is the data to be transmitted by PU 203 when primary user 203 receives allocated PRB map 210 from LTE wireless channel 202. Exemplary primary user data 209 include realtime voice, video or audio streaming, web data, or file transfer.

PRB map 210 is the PRB map allocated to primary user 203 for its data transmission. It is a two dimensional map along time and frequency (channel). PRB map 210 is computed by the PU LTE base station and sent to PU 203 over LTE wireless channels 202.

PRB allocation request 205 is a message sent by the SU 204 to the dynamic spectrum arbitrage controller 201 to allocate PRB for its data transmission. This message may be implemented in the hardware or firmware of SU device 204.

Dynamic physical resource block control apparatus 200 can be made in various ways. In an embodiment, a process for making dynamic physical resource block control apparatus 200 includes connecting dynamic spectrum arbitrage controller 201 to secondary user 204 by a wireline local area network; connecting dynamic spectrum arbitrage controller 201 to LTE wireless channels 202 through a wireless sensing interface; and connecting LTE wireless channels 202 to primary user 203 by wireless LTE interface; and providing a connection between secondary user 204 and LTE wireless channels by wireless LTE interface.

The process for making dynamic physical resource block control apparatus 200 also can include connecting dynamic spectrum arbitrage controller 201 to secondary user 204 over the Internet; connecting dynamic spectrum arbitrage controller 201 to LTE wireless channels 202 through a wireless sensing interface; and connecting LTE wireless channels 202 to primary user 203 by wireless LTE interface; and providing a connection between secondary user 204 and LTE wireless channels by wireless LTE interface.

In another embodiment, a process for making dynamic physical resource block control apparatus 200 includes connecting dynamic spectrum arbitrage controller 201 to secondary user 204 by a wireless local area network; connecting dynamic spectrum arbitrage controller 201 to LTE wireless channels 202 through a wireless sensing interface; and connecting LTE wireless channels 202 to primary user 203 by wireless LTE interface; and providing a connection between secondary user 204 and LTE wireless channels by wireless LTE interface.

Dynamic spectrum arbitrage controller 201 can be made in various ways. In an embodiment, a process for making dynamic spectrum arbitrage controller 201 includes connecting occupancy query engine 224 to hazard function determiner 225 by an application programming interface (API); connecting hazard function determiner 225 to timer 226 by an API; connecting timer 226 to PRB mapper 227 by an API; connecting timer 226 to control communicator 228 by a hardware or software interrupt; and connecting PRB mapper 227 to control communicator 228 by an API; providing a connection between control communicator 228 to secondary user 204 by a wireless link; and providing a connection between occupancy query engine 224 to LTE wireless channels 202 by LTE wireless link.

The process for making dynamic spectrum arbitrage controller 201 also can include connecting occupancy query engine 224 to hazard function determiner 225 by an API; connecting hazard function determiner 225 to timer 226 by an API; connecting timer 226 to PRB mapper 227 by an API; connecting timer 226 to control communicator 228 by a hardware or software interrupt; and connecting PRB mapper 227 to control communicator 228 by an API; providing a connection between control communicator 228 to secondary user 204 by a wireline link; and providing a connection between occupancy query engine 224 to LTE wireless channels 202 by LTE wireless link.

The process of making dynamic spectrum arbitrage 212 includes getting occupancy data on each LTE channel 213 by sensing each channel; building non-parametric cumulative hazard function of idle time durations of each channel 214 using the theory of survival analysis; waiting for the next PRB request from SU 215; running optimal DSA scheme 216 once the PRB request is received; computing the PRB map and sending the PRB map to SU 217; and subsequently going back to waiting for the next PRB request from SU 215.

Dynamic physical resource block control apparatus 200 has numerous advantageous and unexpected benefits and uses. In an embodiment, with reference to FIG. 1 a process for dynamically controlling allocation of physical resource blocks with dynamic physical resource block control apparatus 200 includes: receiving PRB map 210 by primary user 203 from LTE wireless channels 202; sending, by primary user 203, primary user data 209 over LTE wireless channels 202 in accordance with PRB map 210; sending, by secondary user 204, PRB allocation request 205 to dynamic spectrum arbitrage controller 201 when secondary user 204 has secondary user data 211 to send; sending, by dynamic spectrum arbitrage controller 201, channel status request 207 to LTE wireless channels 202; sending, by LTE wireless channels 202, channel status response 208 to dynamic spectrum arbitrage controller 201, channel status response 208 including which of LTE wireless channels 202 are busy and which of LTE wireless channels 202 are idle; performing, by dynamic spectrum arbitrage controller 201, process for optimal dynamic spectrum arbitrage 218 after receiving channel status response 208 from LTE wireless channels 202 and in response to receiving PRB allocation request 205 from secondary user 204; producing, by dynamic spectrum arbitrage controller 201, PRB map 206 from performing process for optimal dynamic spectrum arbitrage 218 returning, by dynamic spectrum arbitrage controller 201, PRB map 206 to secondary user 204 in response to PRB allocation request 205; and transmitting, by secondary user 204, secondary user data 211 over LTE wireless channels 202 in accordance with PRB map 206 from dynamic spectrum arbitrage controller 201 to dynamically control allocation of physical resource blocks with dynamic physical resource block control apparatus 200.

Figure 3:
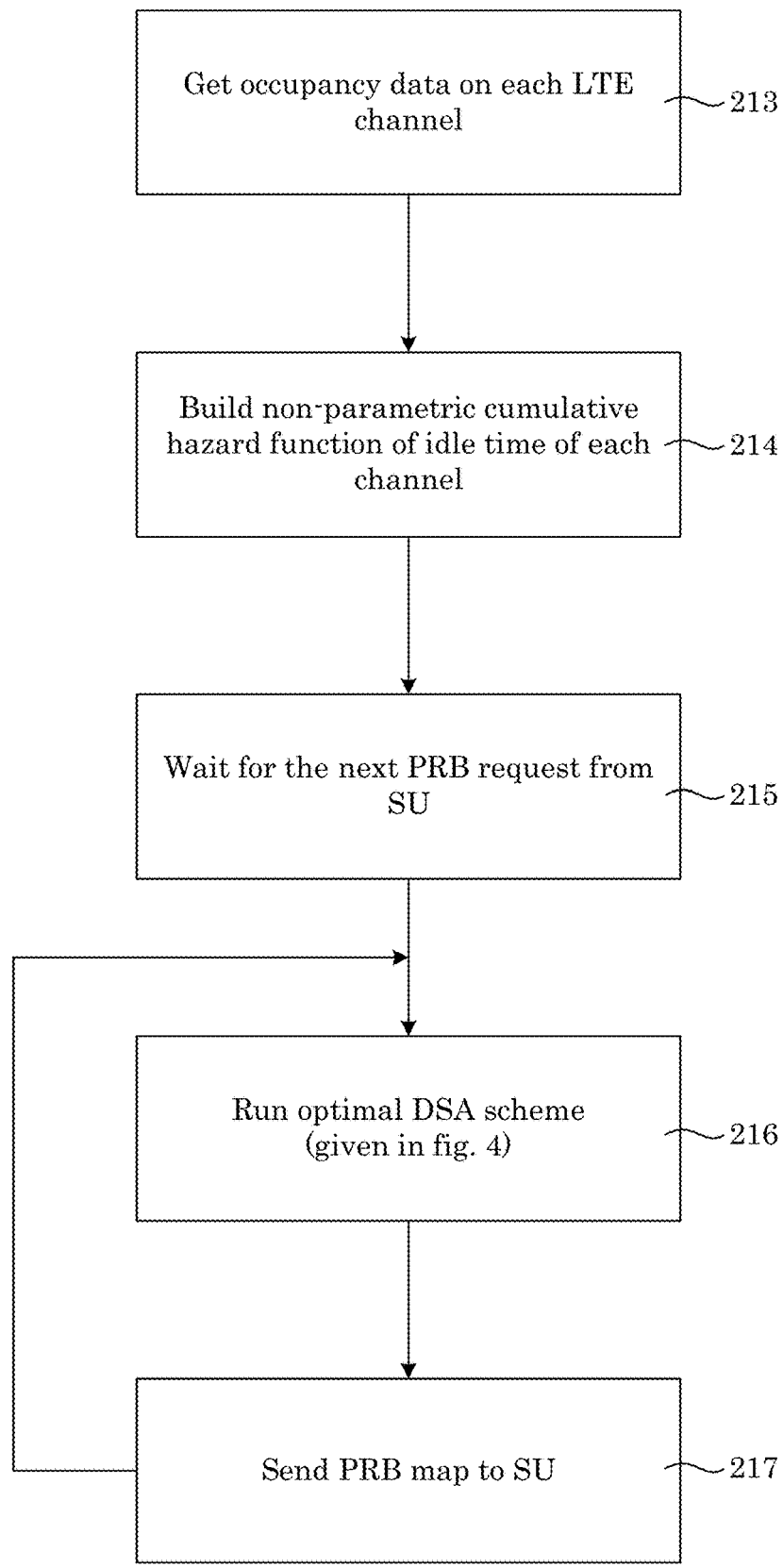
FIG. 3 shows a process for controlling dynamic spectrum arbitrage.

In an embodiment, with reference to FIG. 3, a process for optimal dynamic spectrum arbitrage 218 includes receiving, by dynamic spectrum arbitrage controller 201, channel status response 208 on each of LTE wireless channels 202; using channel status response 208 by hazard function determiner 225 of dynamic spectrum arbitrage controller 201, and non-parametric cumulative hazard function 230, wherein non-parametric cumulative hazard function 230 derived from an idle time duration for each of LTE wireless channels 202; waiting, by timer 226 of dynamic spectrum arbitrage controller 201, for secondary user 204 to make PRB allocation request 205 to dynamic spectrum arbitrage controller 201 via control communicator 228; sending, by control communicator 228 of dynamic spectrum arbitrage controller 201, request receive signal 229 to timer 226, request receive signal 229 being produced by control communicator 228 upon receipt of PRB allocation request 205 from secondary user 204; terminating waiting by timer 226 in response to receiving request receive signal 229 from control communicator 228; sending, by timer 226, non-parametric cumulative hazard function 230 to PRB mapper 227 of dynamic spectrum arbitrage controller 201 after terminating the waiting by timer 226; running, by PRB mapper 227, process for optimal dynamic spectrum arbitrage 218; outputting, by PRB mapper 227, PRB map 206 as a result of running process for optimal dynamic spectrum arbitrage 218; and sending, by dynamic spectrum arbitrage controller 201, PRB map 206 to secondary user 204.

Figure 4:
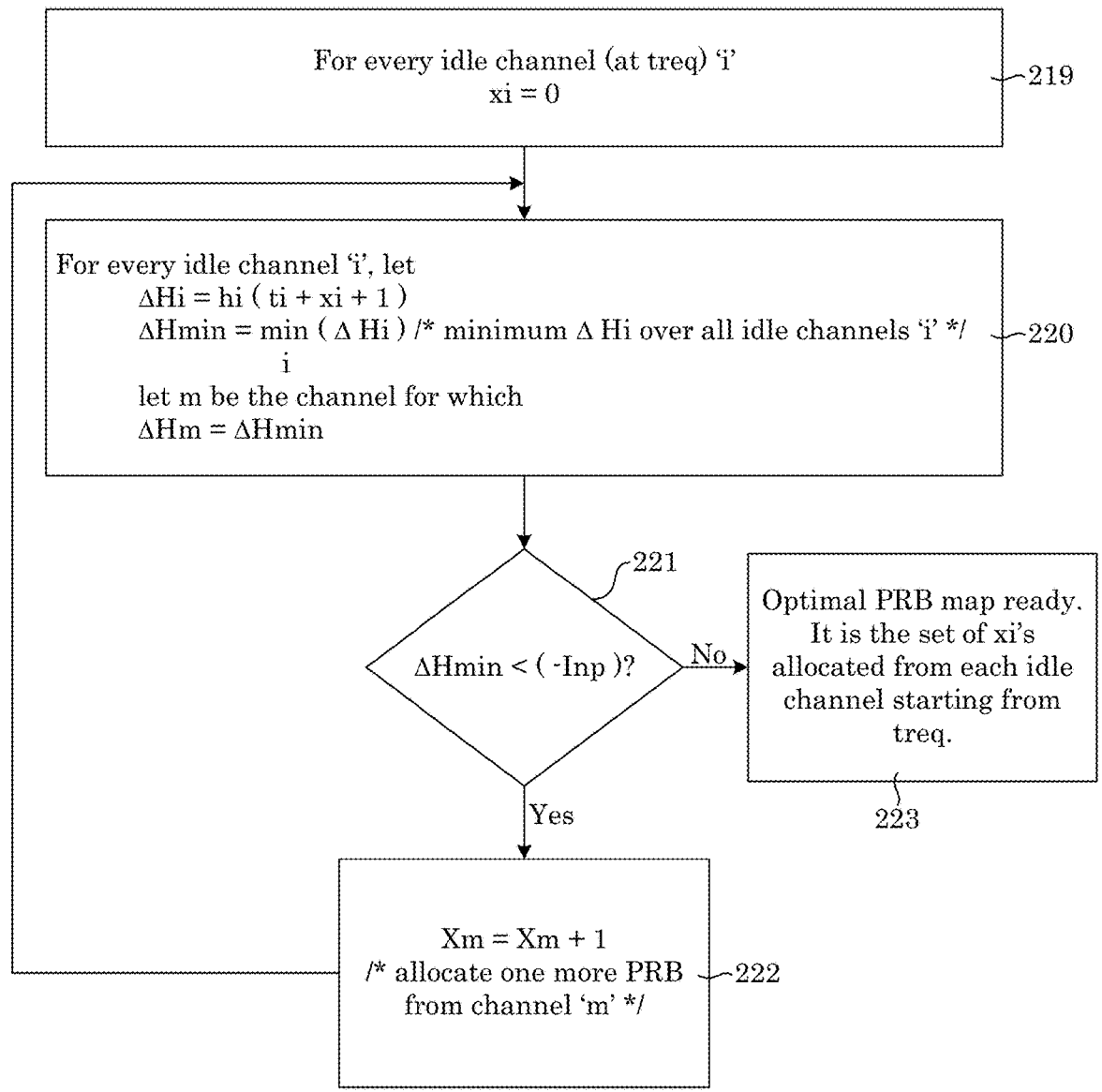
FIG. 4 shows process for optimal dynamic spectrum arbitrage.

In an embodiment, with reference to FIG. 4, the process for optimal dynamic spectrum arbitrage 218 includes: setting, at a time $t_{request}$ when dynamic spectrum arbitrage controller 201 receives PRB allocation request 205 from secondary user 204, to zero a number $x_i$ of the physical resource blocks for each of LTE wireless channels 202 that is idle so that $x_i=0$; determining a change $\Delta H_i$ in non-parametric cumulative hazard function 230 for each LTE wireless channels 202 that is idle as: $\Delta H_i = H_i(t_i + x_i + 1) - H(t_i)$; setting a global minimum $\Delta H_{min}$ of the change $\Delta H_i$ in non-parametric cumulative hazard function 230 to the minimum for the changes in non-parametric cumulative hazard function 230 for each LTE wireless channels 202 that is idle as $$\Delta H_{min} = \min_i (\Delta H_i);$$

selecting, as a target LTE wireless channel m, the LTE wireless channel from among LTE wireless channels 202 that are idle by setting $\Delta H_m = \Delta H_{min}$; determining if $\Delta H_{min} < (-\ln(p))$, wherein p is a threshold probability of a successful transmission; allocating, to secondary user 204 for sending secondary user data 211, an additional physical resource block of the target LTE wireless channel m if $\Delta H_{min} < (-\ln(p))$; and sending PRB map, if $\Delta H_{min} \geq (-\ln(p))$, PRB map 206 from dynamic spectrum arbitrage controller 201 to secondary user 204, wherein PRB map 206 comprises the number $x_i$ of the physical resource blocks allocated from each of LTE wireless channels 202 from time $t_{request}$.

In the process for use of physical resource blocks by primary user 203, receiving PRB map 210 by primary user 203 from LTE wireless channels 202 are sent by the PULTE base station.

In the process for dynamically controlling allocation of physical resource blocks, sending, by primary user 203, primary user data 209 over LTE wireless channels 202 in accordance with PRB map 210 occurs in the time and frequency dimensions as per the PRB map 210.

In the process for dynamically controlling allocation of physical resource blocks, sending, by secondary user 204, PRB allocation request 205 to dynamic spectrum arbitrage controller 201 when secondary user 204 has secondary user data 211 to send occurs by sending out the request over the network interface connected to dynamic spectrum arbitrage controller 201.

In the process for dynamically controlling allocation of physical resource blocks, sending, by dynamic spectrum arbitrage controller 201, status request 207 to LTE wireless channels 202 occurs through its wireless sensing interface.

In the process for dynamically controlling allocation of physical resource blocks, sending, by LTE wireless channels 202, channel status response 208 to dynamic spectrum arbitrage controller 201, channel status response 208 including which of LTE wireless channels 202 are busy and which of LTE wireless channels 202 are idle occurs by a bitmap, each bit of which represents status of the corresponding channel.

In the process for dynamically controlling allocation of physical resource blocks, performing, by dynamic spectrum arbitrage controller 201, process for optimal dynamic spectrum arbitrage 218 after receiving channel status response 208 from LTE wireless channels 202 and in response to receiving PRB allocation request 205 from secondary user 204 occurs by executing each step in the dynamic spectrum arbitrage module.

In the process for dynamically controlling allocation of physical resource blocks, producing, by dynamic spectrum arbitrage controller 201, PRB map 206 from performing process for optimal dynamic spectrum arbitrage 218 returning, by dynamic spectrum arbitrage controller 201, PRB map 206 to secondary user 204 in response to PRB allocation request 205 occurs by sending PRB map 206 over the network interface between dynamic arbitrage controller 201 and secondary user 204.

In the process for dynamically controlling allocation of physical resource blocks, transmitting, by secondary user 204, secondary user data 211 over LTE wireless channels 202 in accordance with PRB map 206 from dynamic spectrum arbitrage controller 201 occurs in the time and frequency dimensions as per the PRB map 206.

In the process for dynamically controlling allocation of physical resource blocks, receiving, by dynamic spectrum arbitrage controller 201, channel status response 208 on each of LTE wireless channels 202 occurs through its wireless network interface.

In the process for dynamically controlling allocation of physical resource blocks, using, by hazard function determiner 225 of dynamic spectrum arbitrage controller 201, non-parametric cumulative hazard function 230, wherein non-parametric cumulative hazard function 230 from idle time durations for each of LTE wireless channels 202 occurs by applying survival analysis.

In the process for dynamically controlling allocation of physical resource blocks, waiting, by timer 226 of dynamic spectrum arbitrage controller 201, for secondary user 204 to make PRB allocation request 205 to dynamic spectrum arbitrage controller 201 via control communicator 228 occurs by software waiting.

In the process for dynamically controlling allocation of physical resource blocks, sending, by control communicator 228 of dynamic spectrum arbitrage controller 201, request receive signal 229 to timer 226, request receive signal 229 being produced by control communicator 228 upon receipt of PRB allocation request 205 from secondary user 204 occurs by using a hardware or software interrupt.

In the process for dynamically controlling allocation of physical resource blocks, terminating waiting by timer 226 in response to receiving request receive signal 229 from control communicator 228 occurs by handling the hardware or software interrupt.

In the process for dynamically controlling allocation of physical resource blocks, sending, by timer 226, non-parametric cumulative hazard function 230 to PRB mapper 227 of dynamic spectrum arbitrage controller 201 after terminating the waiting by timer 226 can be accessed through an application programming interface.

In the process for dynamically controlling allocation of physical resource blocks, running, by PRB mapper 227, process for optimal dynamic spectrum arbitrage 218 occurs by executing the optimal dynamic spectrum arbitrage 218 steps.

In the process for dynamically controlling allocation of physical resource blocks, outputting, by PRB mapper 227, PRB map 206 as a result of running process for optimal dynamic spectrum arbitrage 218 proceeds and is sent through the communication interface to the control communicator 228.

In the process for dynamically controlling allocation of physical resource blocks, sending, by dynamic spectrum arbitrage controller 201, PRB map 206 to secondary user 204 occurs through its communication network interface.

It is contemplated that dynamic spectrum arbitrage controller 201 is subjected to a training phase where dynamic spectrum arbitrage controller 201 observes idle periods of PULTE system, e.g., dynamic physical resource block control apparatus 200, and builds a non-parametric estimate of the cumulative hazard function of idle period durations of each channel. Once the training phase is complete, when secondary user 204 requests for PRBs to transmit, the dynamic spectrum arbitrage controller 201 performs process for optimal dynamic spectrum arbitrage 218 to provide a maximum number of PRBs in which secondary user 204 can transmit such that the probability of interference to the PULTE system is less than a selected threshold. The maximum number of PRBs determined is provided to secondary user 204 as PRB map 206 across LTE wireless channels 202 of PULTE system.

Dynamic physical resource block control apparatus 200 and processes disclosed herein have numerous beneficial uses, including increasing the spectrum utilization of PULTE system by opportunistically sharing the PRBs, providing quality of service to the PUs in terms of limiting interference to them below a set threshold while using maximum number of PRBs, enabling it to operate transparently with the legacy PULTE system without changes performed by conventional PULTE system. Advantageously, dynamic physical resource block control apparatus 200 overcomes limitations of technical deficiencies of conventional compositions such as not sharing their idle PRBs with other users which is a waste of scarce spectrum resources. Further, dynamic physical resource block control apparatus 200 provides spectrum use at the time scale of PRBs, which leads to high spectrum utilization.

Dynamic physical resource block control apparatus 200 and processes herein unexpectedly provides high spectrum utilization by opportunistically sharing PRBs with the PULTE system. Moreover, dynamic physical resource block control apparatus 200 provides seamless integration with the legacy PULTE system because it does not require any changes to be made to legacy PULTE system.

Dynamic physical resource block control apparatus 200 exploits idle PRBs of an LTE system using dynamic spectrum arbitrage controller 201 to perform process for optimal dynamic spectrum arbitrage 218. Process for optimal dynamic spectrum arbitrage 218 can be implemented in secondary user 204 or in the dynamic spectrum arbitrage controller 201 in an absence of changing to PULTE system and provides optimal allocation of PRBs and a guaranteed Quality of Service (QoS) to PU LTE system in terms of keeping the probability of interference below a selected threshold. Advantageously process for optimal dynamic spectrum arbitrage 218 maximizes allocation of PRBs to secondary user 204 while keeping the probability of interference to PULTE system below the selected threshold.

It should be appreciated that process for optimal dynamic spectrum arbitrage 218 overcomes technical problems with conventional LTE systems that do not share their idle PRBs with other users. Lack of sharing of idle PRBs by conventional LTE systems wastes scarce spectrum resources. When idle PRBs of LTE system are used by secondary user 204, then the conventional LTE spectrum use increases. Accordingly, process for optimal dynamic spectrum arbitrage 218 overcomes and solves the problem of spectrum scarcity by increasing spectrum use. Process for optimal dynamic spectrum arbitrage 218 provides guaranteed QoS to the PULTE systems in terms of limiting the probability of interference to the LTE system less than a selected threshold and mitigates some concerns that LTE operators share their spectrum. Further, process for optimal dynamic spectrum arbitrage 218 provides dynamic spectrum access at a time scale of PRBs (0.5 ms) and can produce high spectrum use. In addition, process for optimal dynamic spectrum arbitrage 218 provides maximum number of PRBs to secondary user 204 while limiting the probability of interference to PULTE system as an optimal system.

The articles and processes herein are illustrated further by the following Example, which is non-limiting.

Example

Optimal Dynamic Spectrum Access for Using White Space in LTE Systems

This example describes optimal dynamic spectrum access (DSA) in a shared spectrum system where the primary user (PU) is a Long Term Evolution (LTE) system. The cumulative hazard function from survival analysis is used to predict the remaining idle time available in each channel for secondary user (SU) transmission subject to a probability of successful completion. Optimal allocation of physical resource blocks (PRBs) for the SU is shown to be a variation of the unbounded knapsack problem. We evaluate the process performance using three data sets collected from real LTE systems. The process achieves white space utilization and has a measured probability of interference around the target threshold.

Dynamic spectrum access (DSA) makes efficient use of available spectrum. In a conventional DSA scenario, there are one or more primary users (PUs) operating in a given band with priority access. One or more secondary users (SUs) can opportunistically transmit during times that the PUs are idle. When the PUs want to use the band again, the SUs must stop transmitting. In general, the SUs know whether the band is occupied by the PUs at a given time, either by querying a central coordinator (i.e., scheduler) or by sensing the band. However, the SUs do not know future activity of the PUs. Hence, DSA can be thought of as a prediction process in which an SU scheduler has to predict, with a certain probability, that the SU can complete its transmission before a PU reappears.

LTE cellular systems provide various services using one or more frequency bands comprising multiple channels. LTE is slated to be the first technology to be deployed in the Citizens Broadband Radio Service (CBRS) band, which is based on the shared spectrum paradigm [1]. Although opportunistic DSA is not supported in the CBRS band at present, its semi-dynamic three tier priority-based spectrum sharing is a positive step towards that. The first tier (highest priority) is the federal incumbent, which operates infrequently and only in limited geographic areas. The second tier is licensed LTE; the third tier is unlicensed. Thus, it is appropriate to start thinking about DSA in a network where an LTE system acts as the PU and the SUs communicate by opportunistically accessing the spectrum. Although an LTE eNodeB could in theory be tasked with scheduling the SUs along with its own PU UEs, we believe there are reasons why this is not desirable and, therefore, not likely. SUs may not be subscribers to the PU service. Thus, it is better to deploy a separate and independent SU system whose operation is transparent to the primary LTE system, thereby requiring no changes to the LTE system. This approach also enables legacy LTE systems, i.e., those not implementing our process, to participate in the DSA system. The only interaction between PU and SU systems is at the operator level, where a Service Level Agreement (SLA) may be agreed upon that specifies various operational policies, e.g., an upper bound on the probability of interference.

Resources in LTE are allocated in chunks called physical resource blocks (PRBs). Each PRB is 0.5 ms (one slot) long in time and 180 kHz wide in frequency. In our process, therefore, DSA becomes a matter both of predicting spectrum occupancy by the PU and allocating PRBs for the SU transmission accordingly.

In this Example, a DSA process allocates PRBs to SUs in a system with a statistical guarantee on the probability of interference to the PU LTE system. We frame the allocation of PRBs across time and frequency as a variation of the unbounded knapsack problem. Our process is simple and efficient, which makes it easier to implement in a real system. We show the effectiveness of our process using LTE uplink datasets collected from real deployed LTE systems at the time scale used by LTE systems (1 ms).

Here, we consider allocation of resources in two dimensions, namely time and frequency. Long Term Evolution (LTE) systems employ packet schedulers that schedule users in the time domain and then allocate physical resource blocks (PRBs) among them according to criteria such as channel quality and service rate, but usually no distinction is made between different classes of User Equipments (UEs).

We use an LTE system operating in a given band as the PU. The width of the band in frequency is (N×180) kHz, i.e., the width of N PRBs. We refer to each 180 kHz range of frequency as comprising a channel to aid conceptual understanding. SUs may transmit on PRBs that are idle, but interference to the PUs should be limited. Hence in this DSA application, an SU requests W PRBs, and the goal is to devise a process that allocates up to W PRBs, maintaining the probability of interference on each channel below a specified threshold. Hence, this is a two-dimensional resource allocation problem in which the number of allocated PRBs is maximized, subject to the constraint that the probability of interference on each channel is below a threshold.

A communication channel alternates between idle and busy states. Let I1,B1,I2,B2, . . . represent the successive idle and busy states of a channel. We assume these states are independent and the lengths of all the idle states have the same distribution, say F(t). Our process makes use of the hazard function associated with the distribution F(t). The hazard function at time t, h(t), measures how likely an idle period of unknown length l will end in the next instance given that it has lasted for t units of time and is given by $$h(t) = \lim_{dt \to 0} \frac{Pr[t \leq I < t + dt \mid I \geq t]}{dt} = \frac{f(t)}{1 - F(t)} \quad (1)$$

where f(t)=dF(t)/dt.

Given a specific channel to be shared, the process allows a request to transmit for τ units of time only if the probability that the current idle period I will last for additional duration τ given that it has been idle for duration t (when the SU request arrived) is more than a set threshold p.

That is, the SU request is granted if the following condition is satisfied.

$$Pr[I \geq t+\tau \mid I \geq t] > p \quad (2)$$

This threshold p, 0<p<1, is the probability of successful transmission by the SU. It can be shown that $$P[I \geq t+\tau \mid I \geq t] = \exp(-[H(t+\tau) - H(t)]) \quad (3)$$

where $H(t) = \int_0^t h(s)ds, t \geq 0$ is the cumulative hazard function. However, in practice, H(t) needs to be estimated from the idle time data for which a large sample I1, I2, . . . , In of n idle durations is collected. Let $I(1) \leq I(2) \ldots \leq I(n)$ be the ordered Ii, i=1, . . . , n. Then it can be shown that a non-parametric estimate Hn(t) of H(t) is given by $$H_n(t) = \sum_{i:I_{(i)} \leq t} \frac{1}{n-i+1} \quad (4)$$

From (2) and (3), using Hn(t) in place of H(t), it is easy to deduce that transmission is allowed by the SU if the following inequality is satisfied.

$$H_n(t+\tau) - H_n(t) < (-\ln p) \quad (5)$$

Let xi be the number of PRBs allocated on channel i, wi be the weight of the channel i and N be the number of channels. Let $H_n^i(\cdot)$ be the non-parametric estimate of the cumulative hazard function of channel i. Let $\theta_{th} = (-\ln p)$, where p is the set threshold for probability of successful transmission and ti be the amount of time that channel i has been idle when the SU request for W number of PRBs arrives. Then the two-dimensional resource allocation problem can be formulated as a variation of the well-known unbounded knapsack problem given by $$\text{maximize} \sum_{i=1}^{N} w_i x_i, \text{ subject to} \quad (6)$$

$$\sum_{i=1}^{N} x_i \leq W, x_i \in \{0, \mathbb{Z}^+\} \quad (7)$$

$$w_i \geq 0, i = 1, \ldots, N \quad (8)$$

$$\max_{\leq i \leq N} \theta_i \leq \theta_{th} \quad (9)$$

where $\theta_i = H_n^x(t_i + x_i) - H_n^i(t_i)$.

The above optimization formulation maximizes the total weighted value of the allocated PRBs subject to the constraints. Constraint (7) limits the allocation to a maximum of W PRBs requested by an SU, whereas constraint (9) makes sure that the probability of interference on any channel is below the specified threshold.

To keep our analysis simple, in this study, we have assumed that all channels have equal weight by setting wi=1, 1≤i≤N. In general, the weights can be assigned based on (for example) channel quality or priority.

The unbounded knapsack problem is known to be NP-Hard. Hence, we use a pseudo-polynomial process using dynamic programming to solve our two-dimensional resource allocation problem. Let ti be the length of the current idle period for channel i and $H_n^i(\cdot)$ be the non-parametric estimate of cumulative hazard function of channel i. The process for finding the optimal allocation of resource blocks is presented in Process Fixed_PRB, which outputs xi's, the number of PRBs allocated to the SU in channel i. Essentially the process uses the SU transmission constraint given in (5) across each channel and solves the optimization formulation presented in (6).

For some applications, an SU may want to request the maximum possible number of PRBs subject to the constraints. A minor modification to Process Fixed_PRB can achieve that. The only change required is to remove the condition in the while loop and make it an infinite loop. The process terminates when no more PRBs can be allocated on any of the N channels, i.e., the if statement inside the while loop fails. We call this Process Max_PRB.

Figure 6:
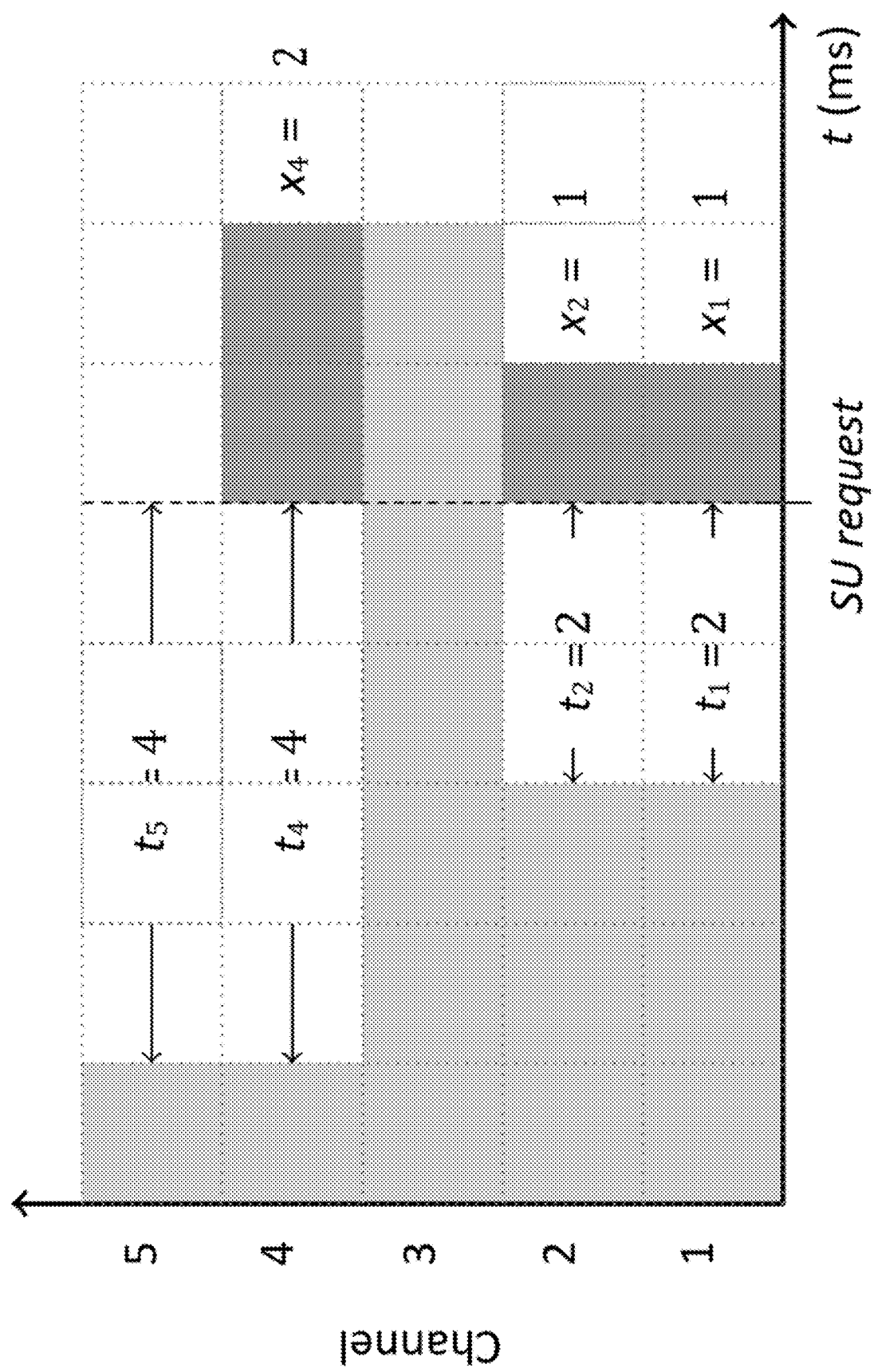
FIG. 6 shows an allocation of resource blocks for a secondary user, wherein primary user transmissions are green, and secondary user transmissions are in blue.

FIG. 6 illustrates a possible allocation using Process Fixed_PRB with 5 channels. In the figure, the SU requests W=4 PRB pairs at time shown. The idle time lengths of the channels are shown as ti, i=1,2,4,5 (Channel 3 is busy at the time of request). The optimal allocation is shown as the set of $\{x_i : \Sigma_i x_i = W\}$ that satisfies the interference constraint across all the channels.

We use three sets of collected data to model PU activity. The first set was collected using an indoor antenna on the National Institute of Standards and Technology (NIST). The second and third datasets were collected using outdoor antennas. The locations were chosen to test our process in indoor and outdoor settings in an urban environment. Data were collected in Band 17, a 10 MHz uplink (UL) LTE band centered at 709 MHz at all the three locations.

NIST campus data collection system consisted of a 10.78 cm "rubber duck" antenna connected to a universal software radio peripheral (USRP). A 56-point power spectrum (in dB) for each 1 ms period (after aggregating I/Q samples every 80 ns) was computed and the middle 50 values used as power values of the 50 LTE channels. Since LTE allocates PRBs in pairs, our collected dataset consisted of an integer power value, in dB, for a pair of PRBs (1 ms in time). A noise power threshold was then applied to produce a binary occupancy sequence for each of the 50 channels. The noise power threshold was chosen 3 dB above the value that produced a probability of false alarm (PFA) below 1%.

Data was collected for two different one-hour periods that were selected so that we could compare the same time period on two separate days.

The second and third datasets were collected at two locations in the metro Philadelphia area on the CityScape spectrum monitoring system with additional processing of the I/Q samples to produce output files in the same format as the data collected at NIST. We converted the CityScape datasets into binary occupancy sequences using the noise threshold to which the CityScape USRPs were calibrated.

In our experiments, we used occupancy data of LTE uplink channels from channel 15 to 24 (total of 10 channels) as PU traffic. This ensures that the SU does not transmit over the control channels, Physical Random Access Channel (PRACH) and Physical Uplink Control Channel (PUCCH). Idle and busy periods for each channel were built based on a sampling interval (1 ms) and noise threshold. Then a non-parametric estimation of the cumulative hazard function of each channel is computed. The threshold for probability of successful transmission is set to 0.9, which implies the threshold of probability of interference is 0.1.

We evaluate the performance of our process in different configurations. The configurations are denoted with a concatenation of three text strings separated by underscores in the form station_train_run, where station∈{lab, upenn01, upenn02}—is the location where the data was collected, train∈ {$1^{st}$, $2^{nd}$} represents the data used for training the process, i.e., data used for building the cumulative hazard function and run∈{1st, 2nd} denotes the data that represents the PU spectrum occupancy while running the process. For lab station, values of $1^{st}$ and $2^{nd}$ represent one-hour data from $1^{st}$ and $2^{nd}$ day respectively. For upenn01 and upenn02 station, $1^{st}$ and $2^{nd}$ represent the first and second half of the one-hour data collected at those stations respectively. For example, in configuration lab_$1^{st}$_$2^{nd}$ a process is trained using one-hour data collected in NIST lab from the $1^{st}$ day and run using one-hour data from the $2^{nd}$ day. A process trained using the $1^{st}$ half-hour data collected at upenn01 station and run using the $2^{nd}$ half-hour data is denoted as configuration upenn01_$1^{st}$_$2^{nd}$.

The SU traffic is modeled as a Poisson arrival process. For Process Fixed_PRB, an SU requests a fixed number of PRBs and the process allocates up to that many PRBs while ensuring that the probability of interference is below the specified threshold. For Process Max_PRB, an SU requests the maximum possible number of PRBs, and the process allocates the maximum possible PRBs subject to the given interference probability constraint. The requests and allocations in our simulation are always in terms of 1 ms time lengths, but we use the term PRBs rather than "pair of PRBs" for simplicity.

Performance of the two process was measured with the following metrics, including white space utilization (WSU). Given the spectrum occupancy of a set of channels, the WSU by an SU is defined as the fraction of total idle PRBs used by the SU for its own transmission. In other words, it is the ratio of number of idle PRBs used by the SU for its own transmission to the total idle PRBs present in the spectrum occupancy of the set of channels.

With regard to probability of interference (PoI), PoI of the secondary user across a set of channels is defined as the probability that a transmission of the SU collides with that of the PU on those channels. Thus, it is the ratio of the number of times an SU transmission collides (or runs into a busy period) with a PU transmission across those set of channels to the total number of SU transmissions over a long observation period.

With regard to percentage overlap of su transmission (POST), POST is the number of PRBs used for SU transmissions that overlaps with PU transmissions across a set of channels expressed as a percentage of total PRBs used for SU transmissions across the same set of channels.

Figure 7:
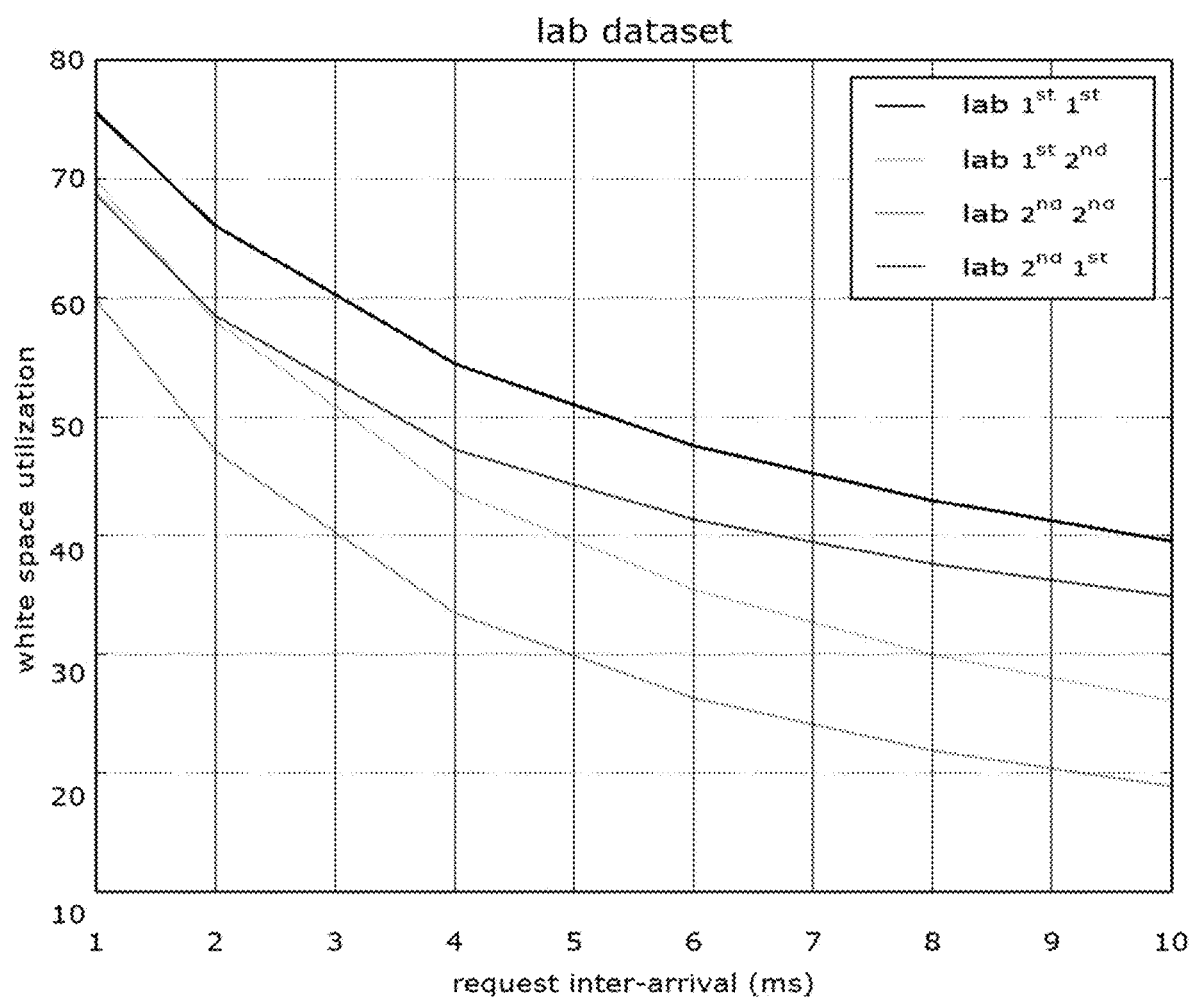
FIG. 7 shows WSU versus inter-arrival time for a lab dataset running process max_PRB.
Figure 8:
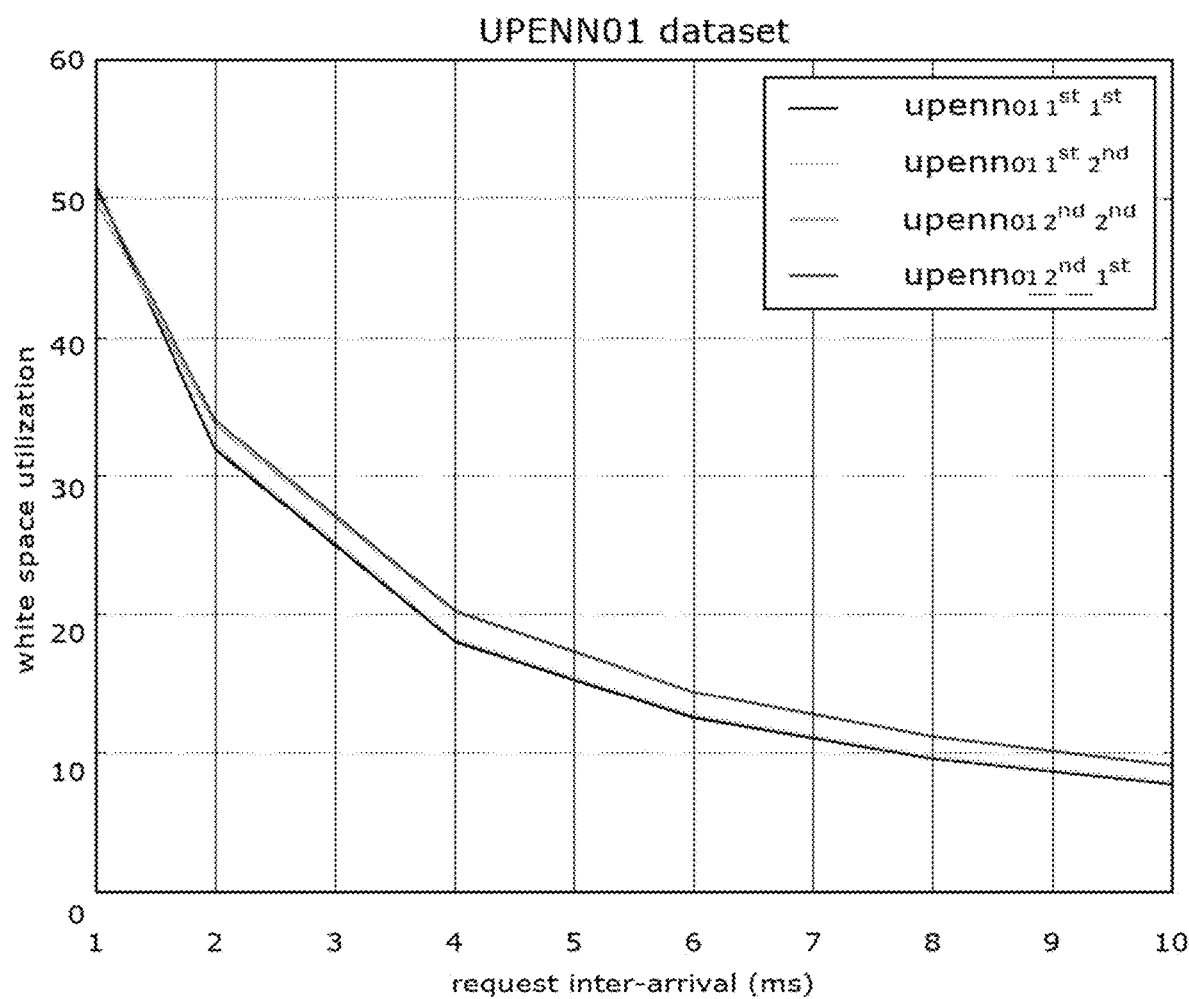
FIG. 8 shows WSU versus inter-arrival time for upenn01 dataset running process max_PRB.
Figure 9:
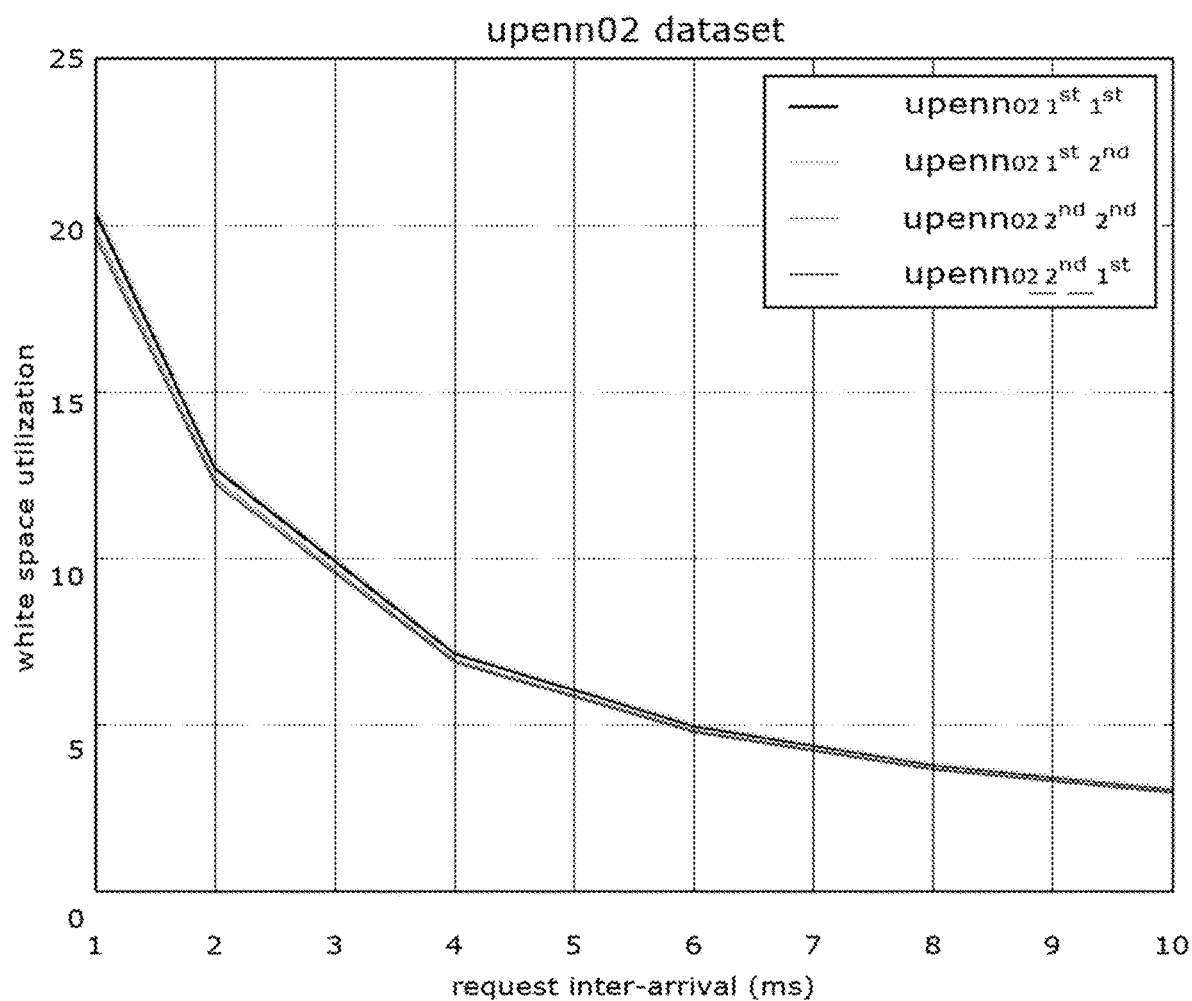
FIG. 9 shows WSU versus inter-arrival time for upenn02 dataset running process max_PRB.

With regard to performance of Process Max_PRB, FIG. 7, FIG. 8, and FIG. 9 show performance of Process Max_PRB in terms of WSU as the average request inter-arrival duration increases for lab, upenn01 and upenn02 datasets respectively. As average request inter-arrival duration increases, the offered load to the process decreases, leading to a decrease in WSU for all the datasets. However, for the lab dataset, WSU is much higher than for the upenn01 and upenn02 datasets. For the lab dataset, all ten channels are idle for about 95% of the time (for $1^{st}$ day), whereas for upenn01, it varies between 89% to 90% and for upenn02, it varies between 57% to 89% (see Table I). Further, for the lab dataset, maximum idle duration across the ten channels (for $1^{st}$ day) vary between 35 345 ms to 51 532 ms. But the maximum idle durations in the upenn01 dataset lie between 136 ms and 191 ms. For upenn02 those numbers are 34 ms to 154 ms. Thus, the lab data has idle durations two orders of magnitude greater than those of upenn01, and upenn01 idle durations are significantly higher than those of upenn02. Also, the idle durations of the lab data were not continuous, causing long flat periods in the H($\bullet$) function, leading to allocations of more PRBs than in the upenn01 and upenn02 datasets. This also causes the slope of H($\bullet$) function of the lab data to be lower than that of upenn01 and upenn02 datasets. Since a lower slope of H($\bullet$) function leads to higher number of PRB allocation (see Eqn (5)), WSU for lab dataset is much higher compared to those of upenn01 and upen02. Comparing WSU between upenn01 and upenn02, we notice that the WSU of upenn01 is higher. This is attributed to the fact that fraction of idle time and the maximum idle duration of channels are much higher in upenn01 dataset than those of upenn02.

In FIG. 7, we observe that the WSU for lab-1st-1st is the highest and for lab_$2^{nd}$_$2^{nd}$ is the lowest. This is largely because there are larger idle durations on the $1^{st}$ day compared to the $2^{nd}$ day. WSU of the other two configurations lies between these two.

For the upenn01 and upenn02 datasets, the relative performance of WSU among different configurations is close to each other. Note that configurations with $1^{st}$_$1^{st}$ and $2^{nd}$_$2^{nd}$ suffixes are not practical, since the process is run on the same data as the training data. In practice, the process will train (i.e., build the H($\bullet$) function) on the first half hour (or some fixed duration) data and then allocate PRBs to SU using the built H($\bullet$) function. So, $1^{st}$_$2^{nd}$ represents such a scenario. $2^{nd}$_$1^{st}$ represents a scenario where the PU traffic may be swapped between the two half hour periods (in case such traffic occurs in practice). Since the relative performances are close to each other, it shows that a system deploying Process Max_PRB can perform as well as the theoretical system (e.g., $1^{st}$_$1^{st}$) when it trains on first half hour data and then runs on the next half hour.

Figure 10:
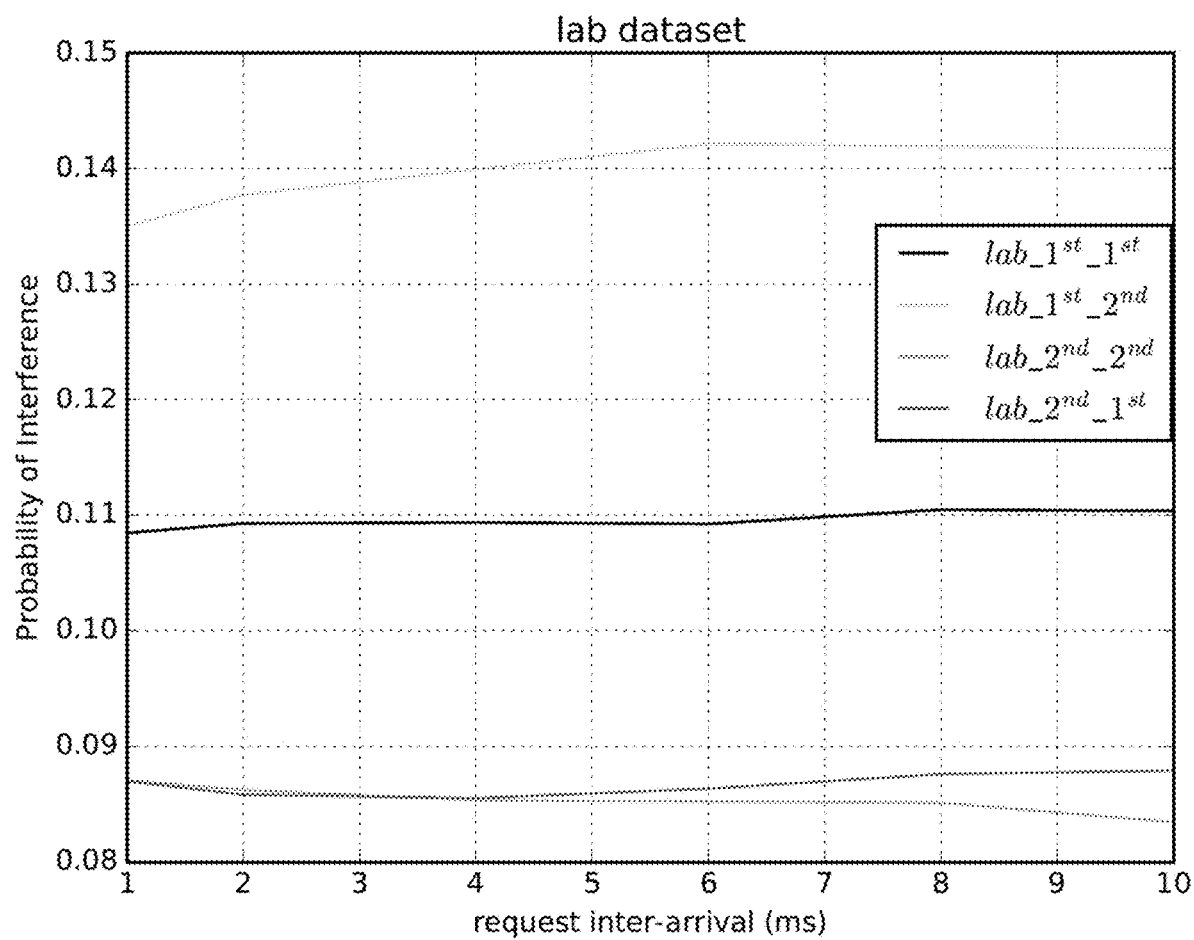
FIG. 10 shows a probability of interference versus inter-arrival time for lab dataset running process max_PRB.
Figure 11:
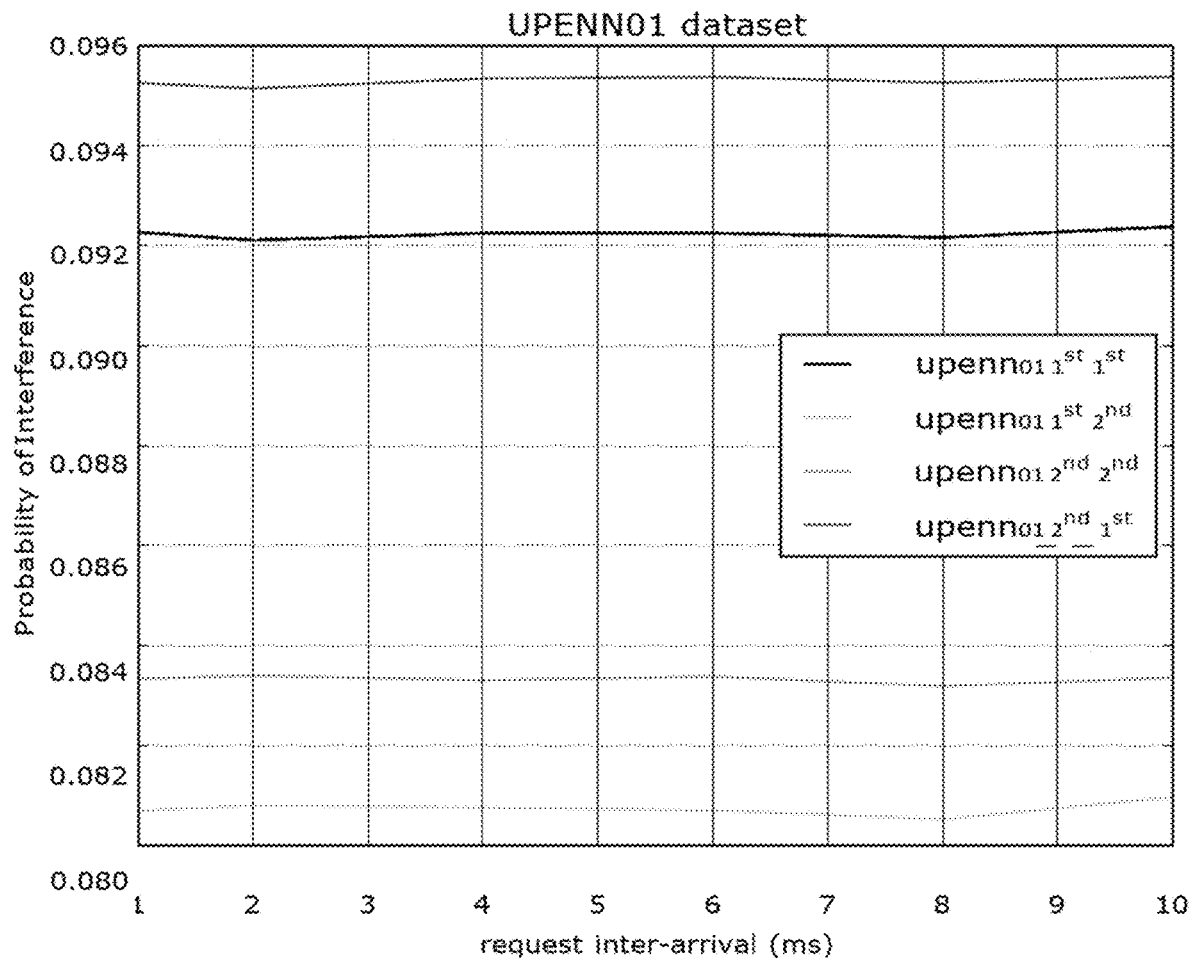
FIG. 11 shows a probability of interference versus inter-arrival time for upenn01 dataset running process max_PRB.
Figure 12:
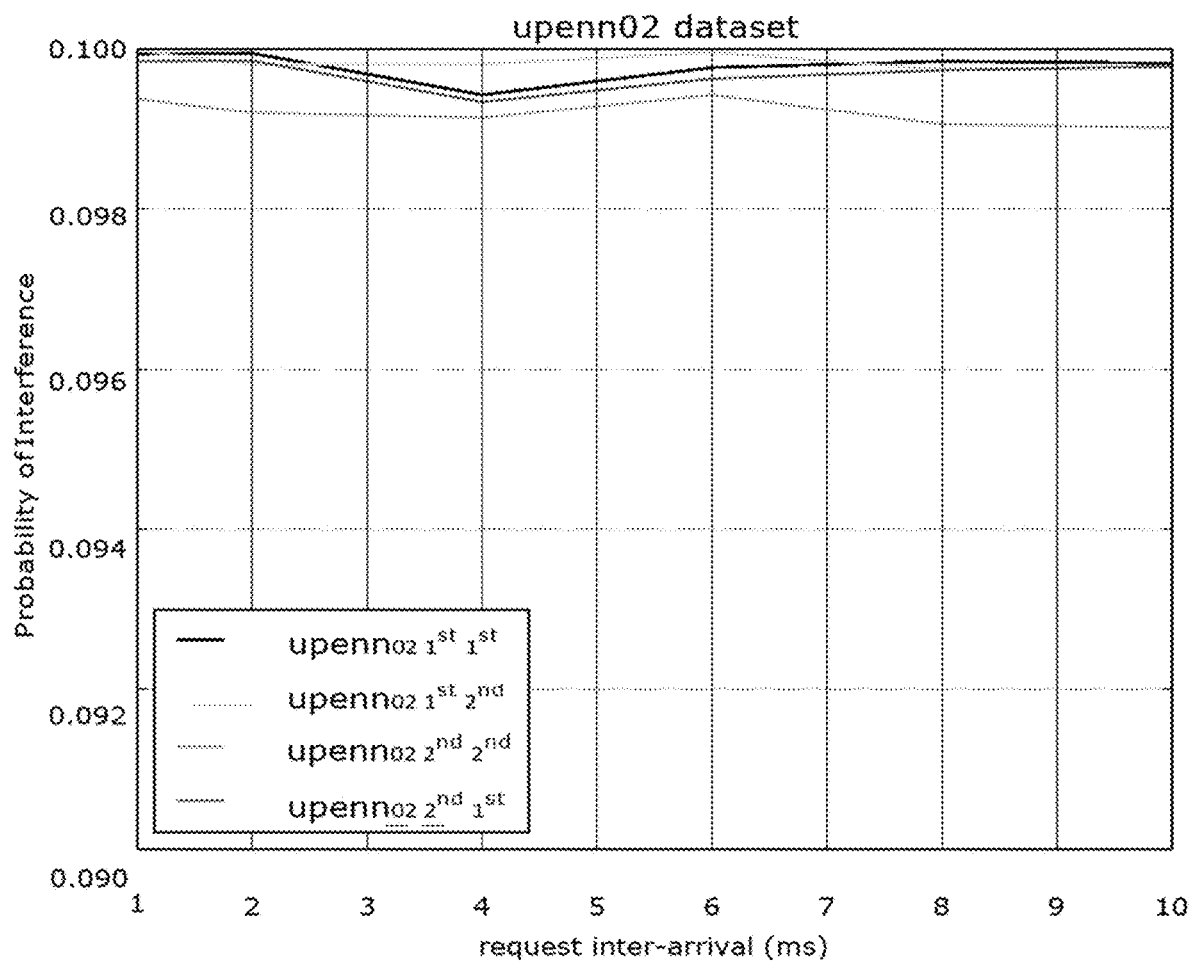
FIG. 12 shows a probability of interference versus inter-arrival time for upenn02 dataset running process max_PRB.

FIG. 10, FIG. 11, and FIG. 12 present the measured PoI as average SU request inter-arrival time increases for the three datasets. Measured PoI for the upenn01 and upenn02 datasets is always below the set threshold (0.1) for all configurations. For the lab dataset, the measured PoI is below the threshold for the lab_$2^{nd}$_$2^{nd}$ and lab_$2^{nd}$_$1^{st}$ configuration. However, for the other two configurations (lab_$1^{st}$_$1^{st}$ and lab_$1^{st}$_$2^{nd}$) the measured PoI is slightly higher than the threshold. The first lab dataset has longer idle time durations and is idle for a higher fraction of time. So, when the process is trained using this data, the PRB grants are more generous (H($\bullet$) function is more relaxed) and hence when the process runs on the second dataset it encounters more interference. When the process is trained and run on first dataset (configuration $1^{st}$_$1^{st}$), the PoI slightly exceeds the threshold mostly due to estimation error (of H($\bullet$) function). Measured PoI remains almost constant in all configurations of all datasets as the inter-arrival time between SU requests increases. Hence, the performance of the PU system remains almost the same regardless of the load on the SU system.

Figure 13:
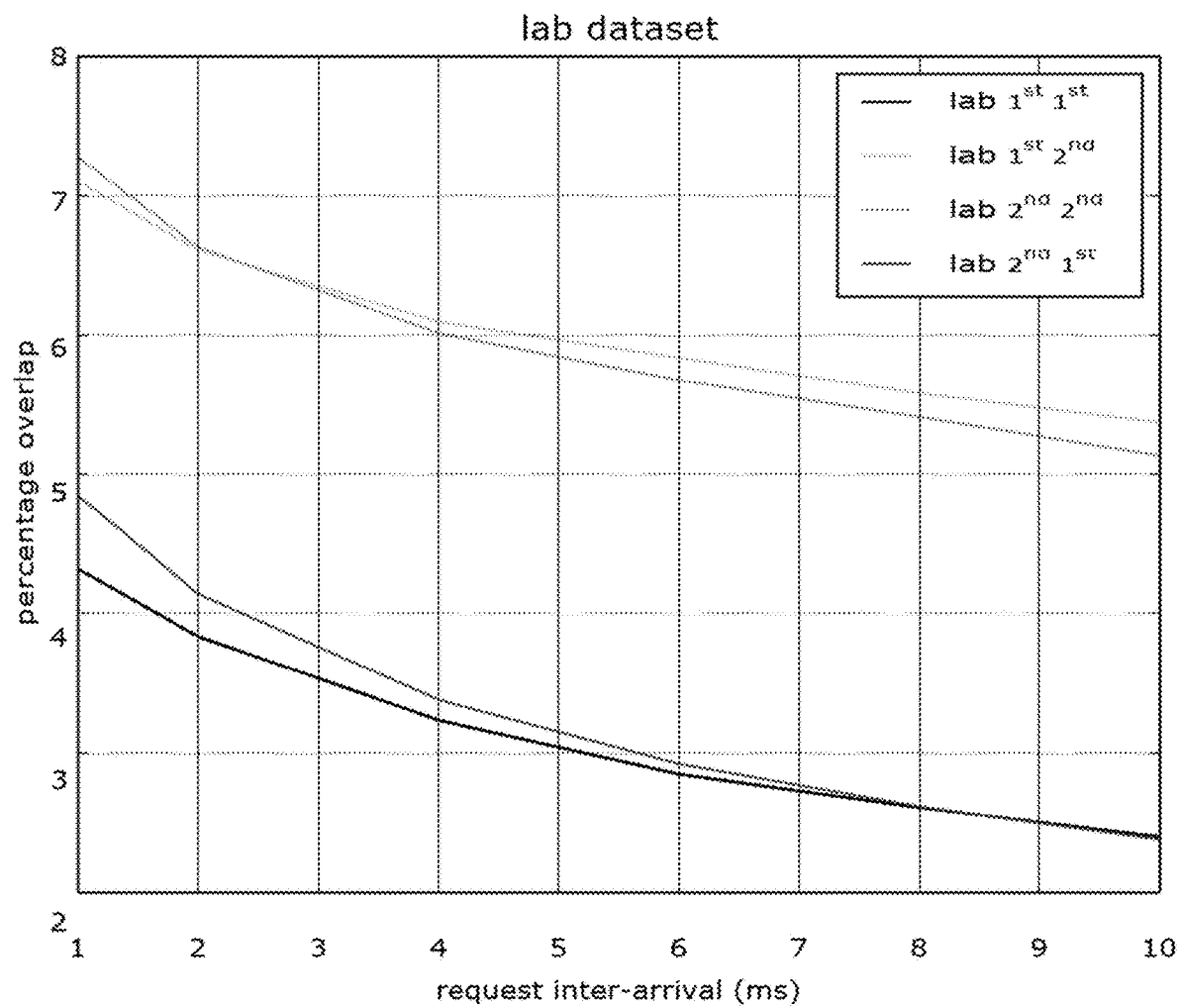
FIG. 13 shows a percentage overlap versus inter-arrival time for lab dataset running process max_PRB.
Figure 14:
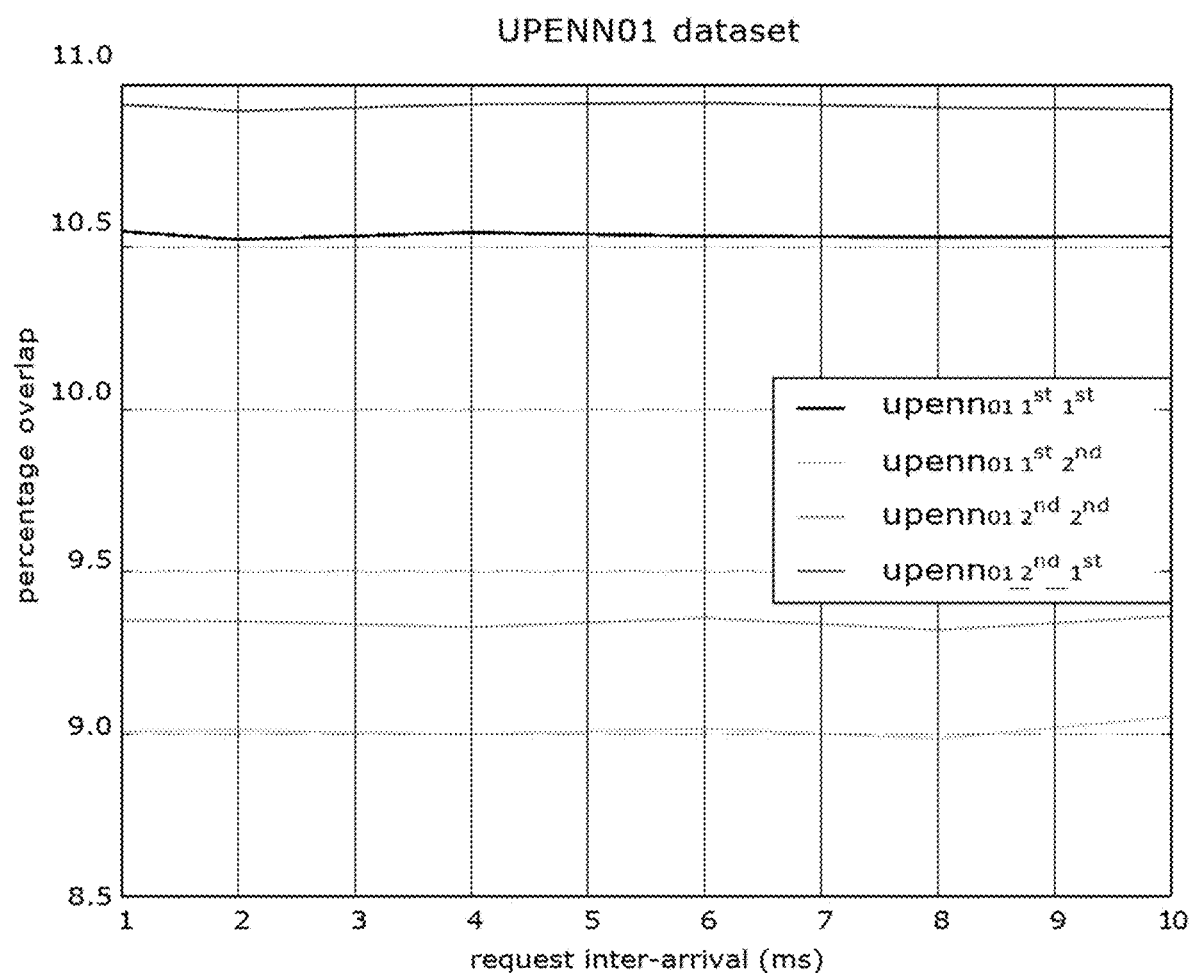
FIG. 14 shows a percentage overlap versus inter-arrival time for upenn01 dataset running process max_PRB.
Figure 15:
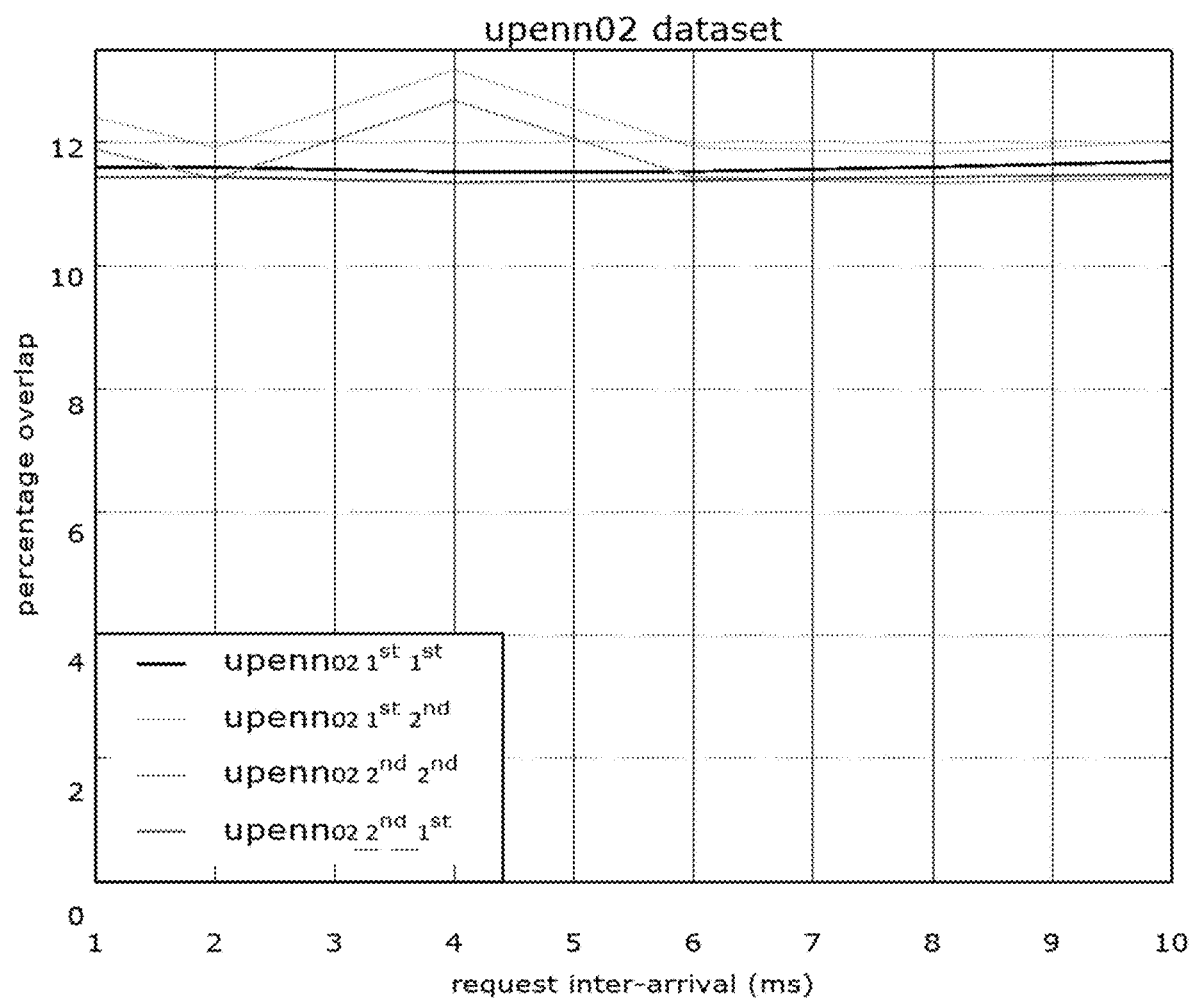
FIG. 15 shows a percentage overlap versus inter-arrival time for upenn02 dataset running process max_PRB.

FIG. 13, FIG. 14, and FIG. 15 show POST values for the lab, upenn01 and upenn02 datasets respectively. The percentage overlap is below 7.5% for all configurations for the lab dataset. For upenn01 and upenn02 the maximum we see are 11% and 13%, respectively. The lab dataset has a higher fraction of idle duration, and some idle periods are very long, which leads to a lower POST value.

Figure 17:
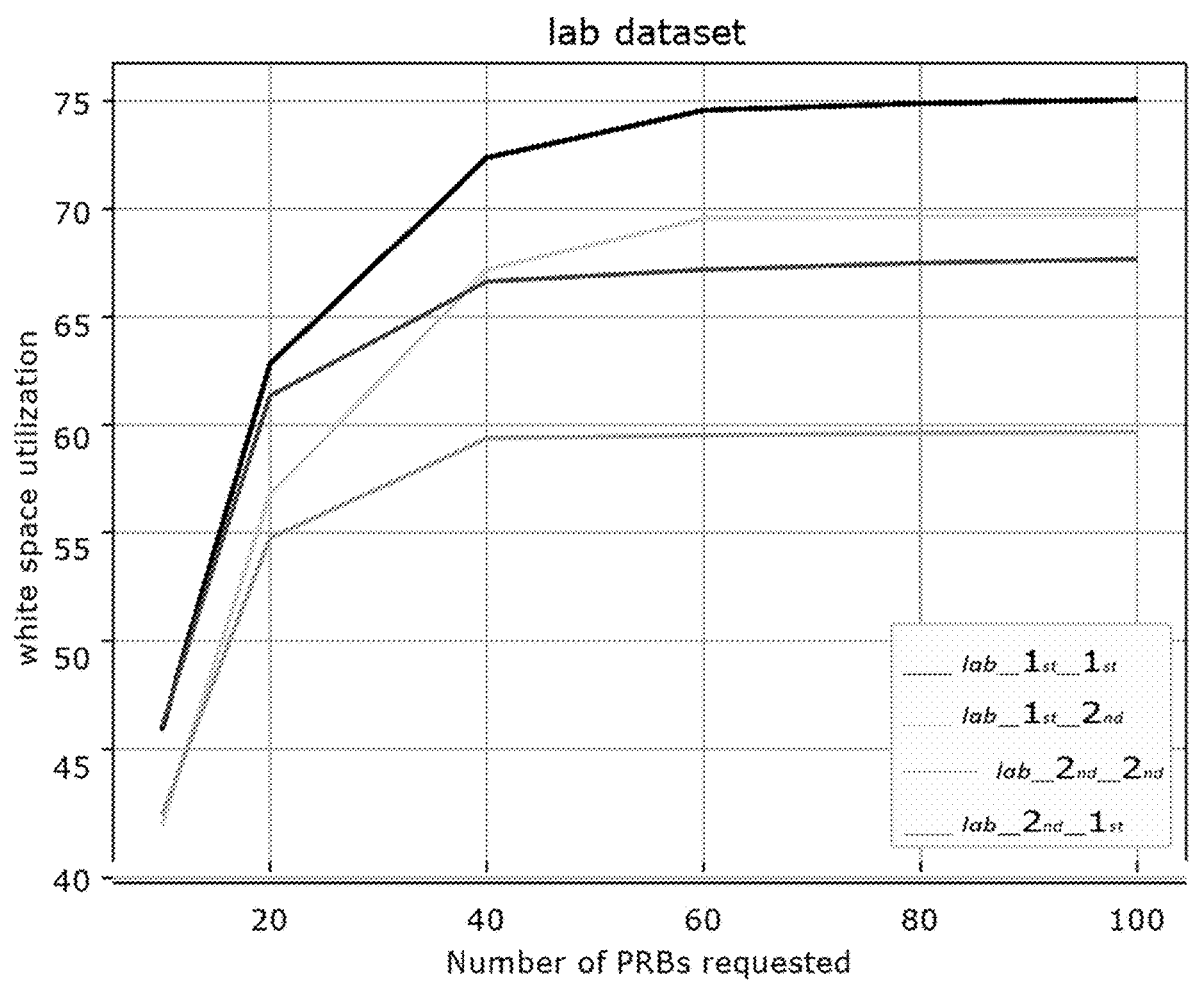
FIG. 17 shows WSU versus number of requested PRBs for lab dataset running process fixed_PRB.
Figure 18:
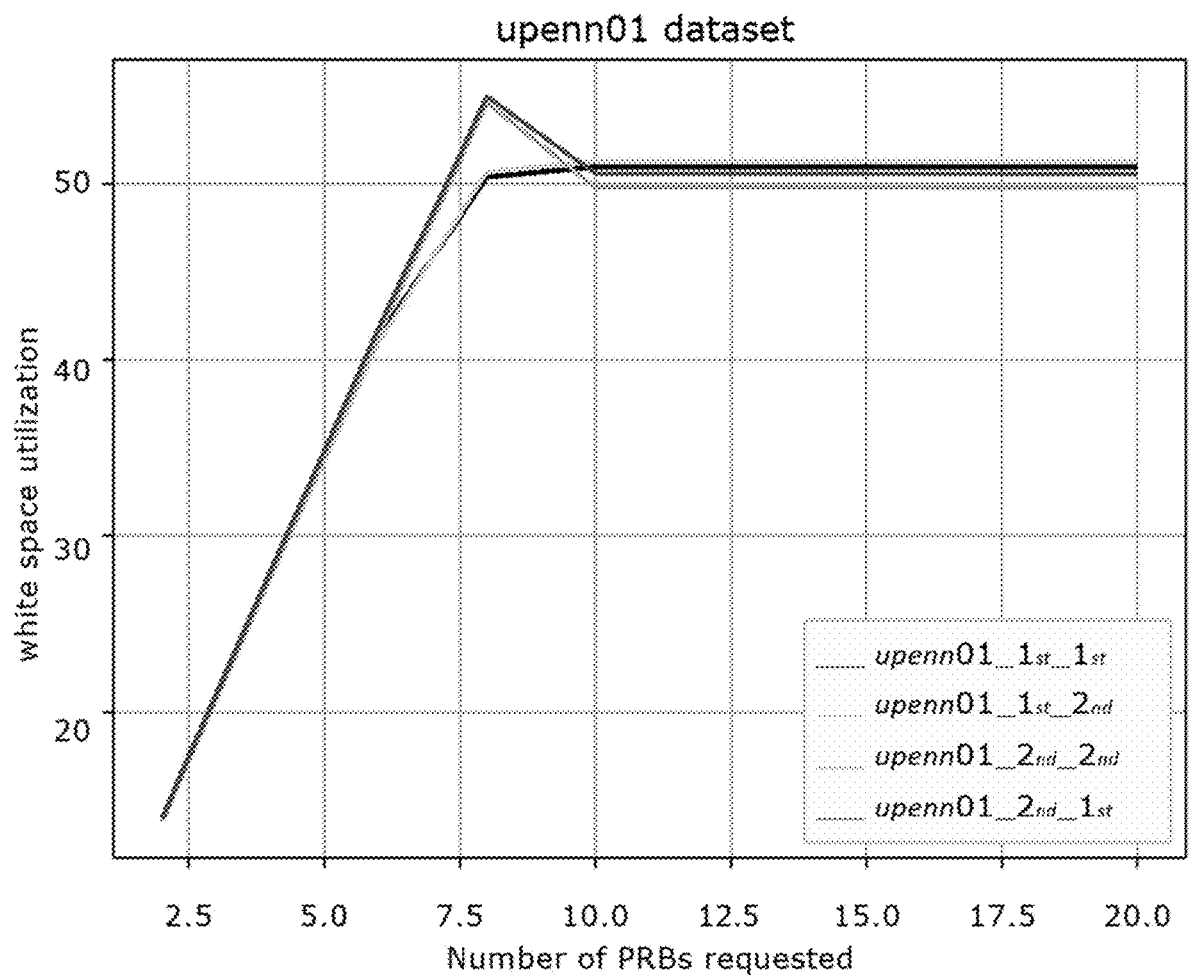
FIG. 18 shows WSU versus number of requested PRBs for upenn01 dataset running process fixed_PRB.

FIG. 17 and FIG. 18 show how WSU varies when the number of requested PRBs increases for Process fixed_PRB over the lab and upenn01 datasets, respectively, when the average SU request inter-arrival time is 1 ms. WSU increases as more PRBs are requested, since the process exploits more white space before reaching a limiting value. The process is limited by the available white space and the interference constraint. Hence, beyond a certain point, the process cannot grant the requested number of PRBs and instead allocates the maximum possible within the constraints. In fact, the values at which WSU saturates match the WSU values of Process Max_PRB corresponding to average request inter-arrival time of 1 ms. Similar to Process Max_PRB, the WSU values are close to each other for various configurations in the upenn01 dataset. For the lab dataset the WSU for lab_$1^{st}$_$1^{st}$ is the highest and for lab_$2^{nd}$_$2^{nd}$ is the lowest, and WSU for the other two configurations lies between these two. The reasons for these relative performances are the same as those given for Process Max_PRB.

Figure 19:
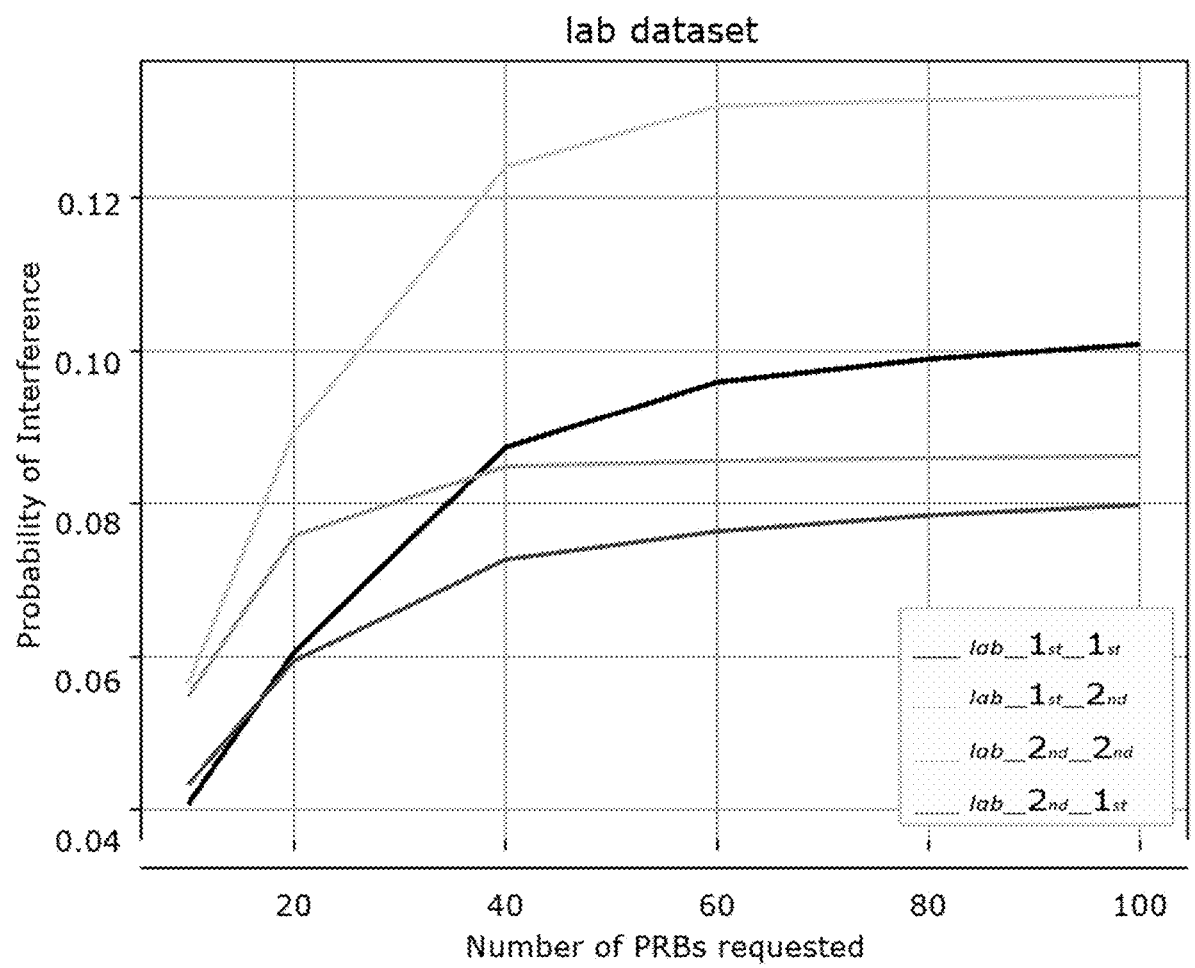
FIG. 19 shows a probability of interference versus number of requested PRBs for lab dataset running process fixed_PRB.
Figure 20:
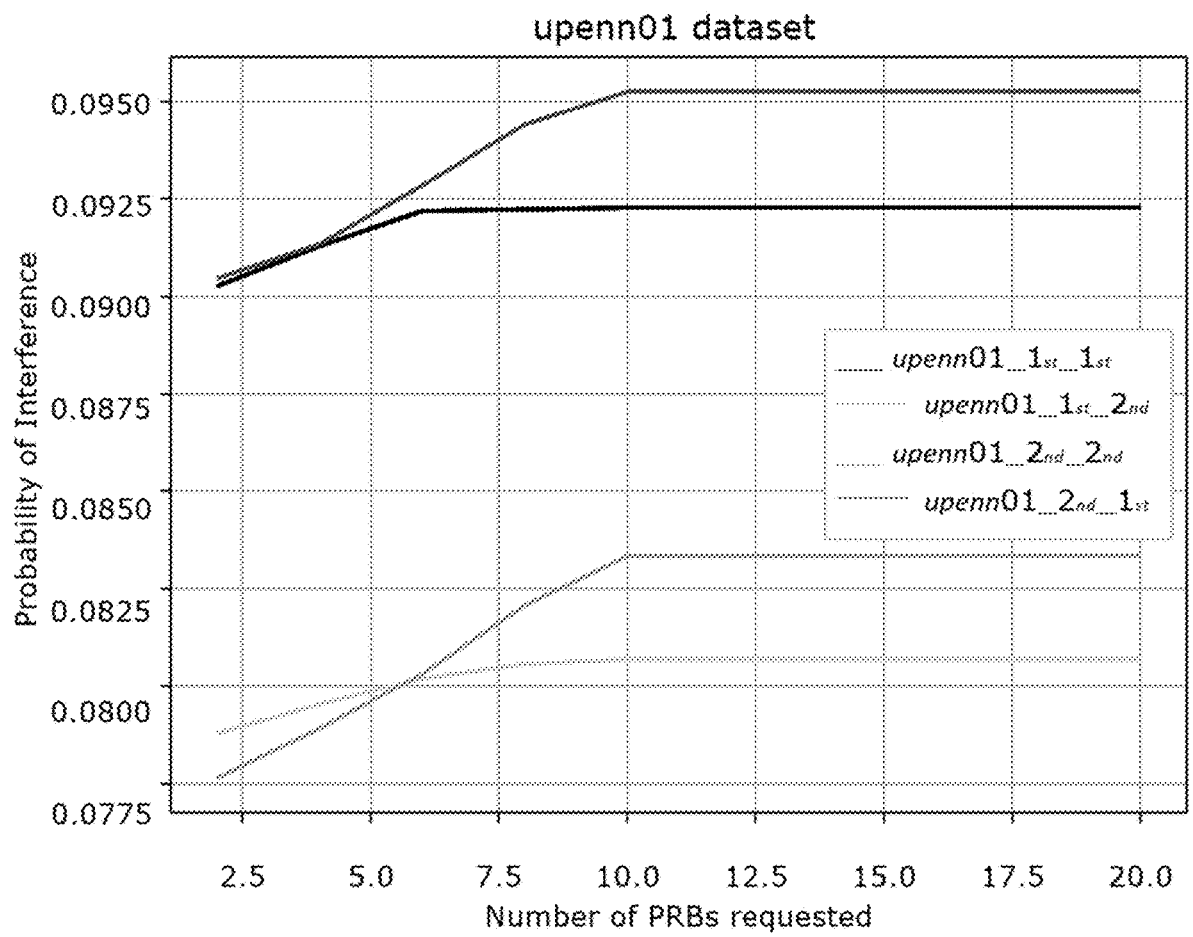
FIG. 20 shows a probability of interference versus number of requested PRBs for upenn01 dataset running process fixed_PRB.

FIG. 19 and FIG. 20 show a measured PoI for the lab and upenn01 datasets that initially increases as the number of requested PRBs increases and then stays constant. These constant (saturated) PoI values match the corresponding values for Process Max_PRB when the average request inter-arrival time is 1 ms. For all the datasets and all configurations, except for lab_$1^{st}\_2^{nd}$ measured PoI is less than the set threshold. The anomaly in lab_$1^{st}\_2^{nd}$ is due to the same reason given for Process Max_PRB.

Figure 21:
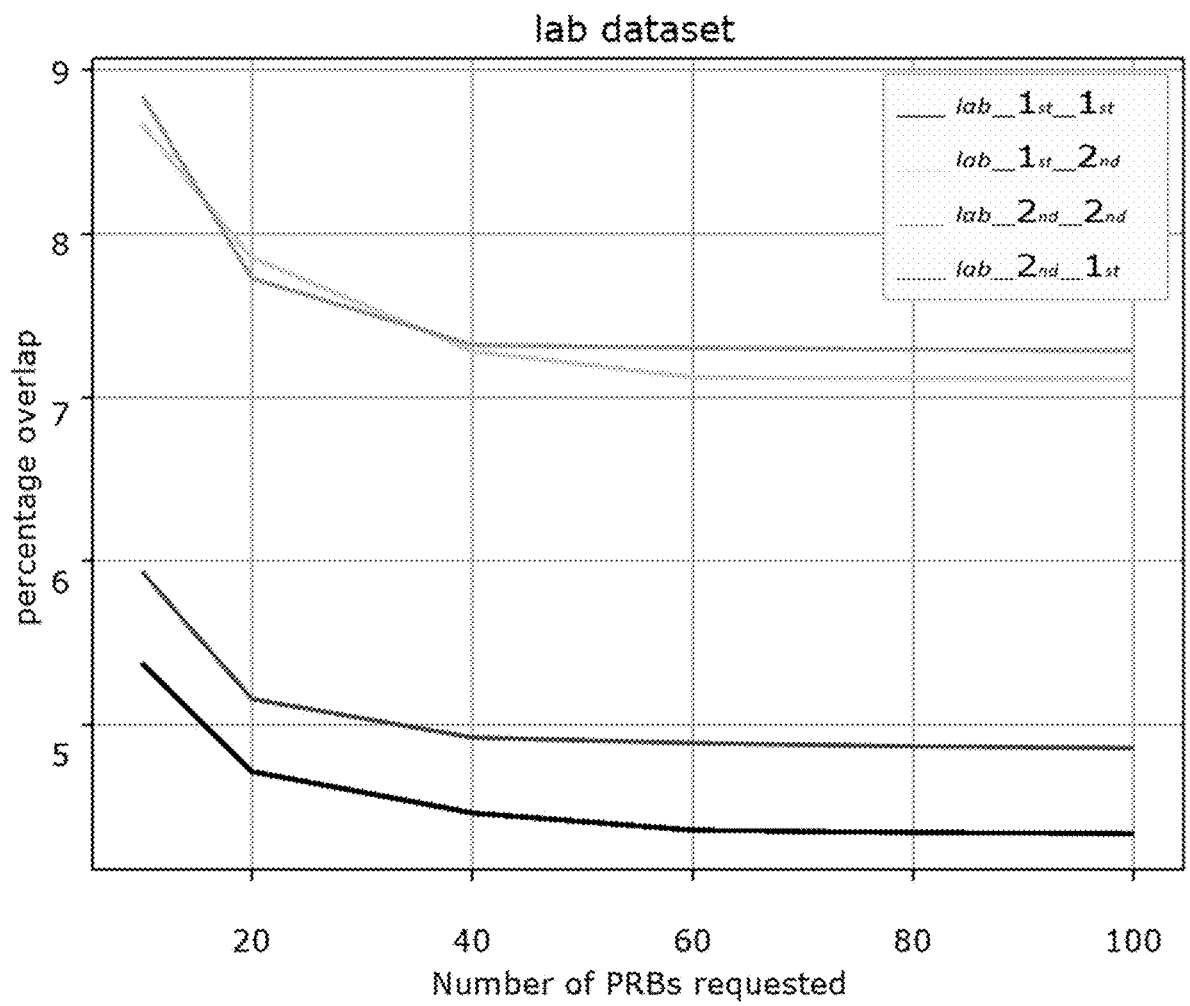
FIG. 21 shows a percentage overlap versus number of requested PRBs for lab dataset running process fixed_PRB.
Figure 22:
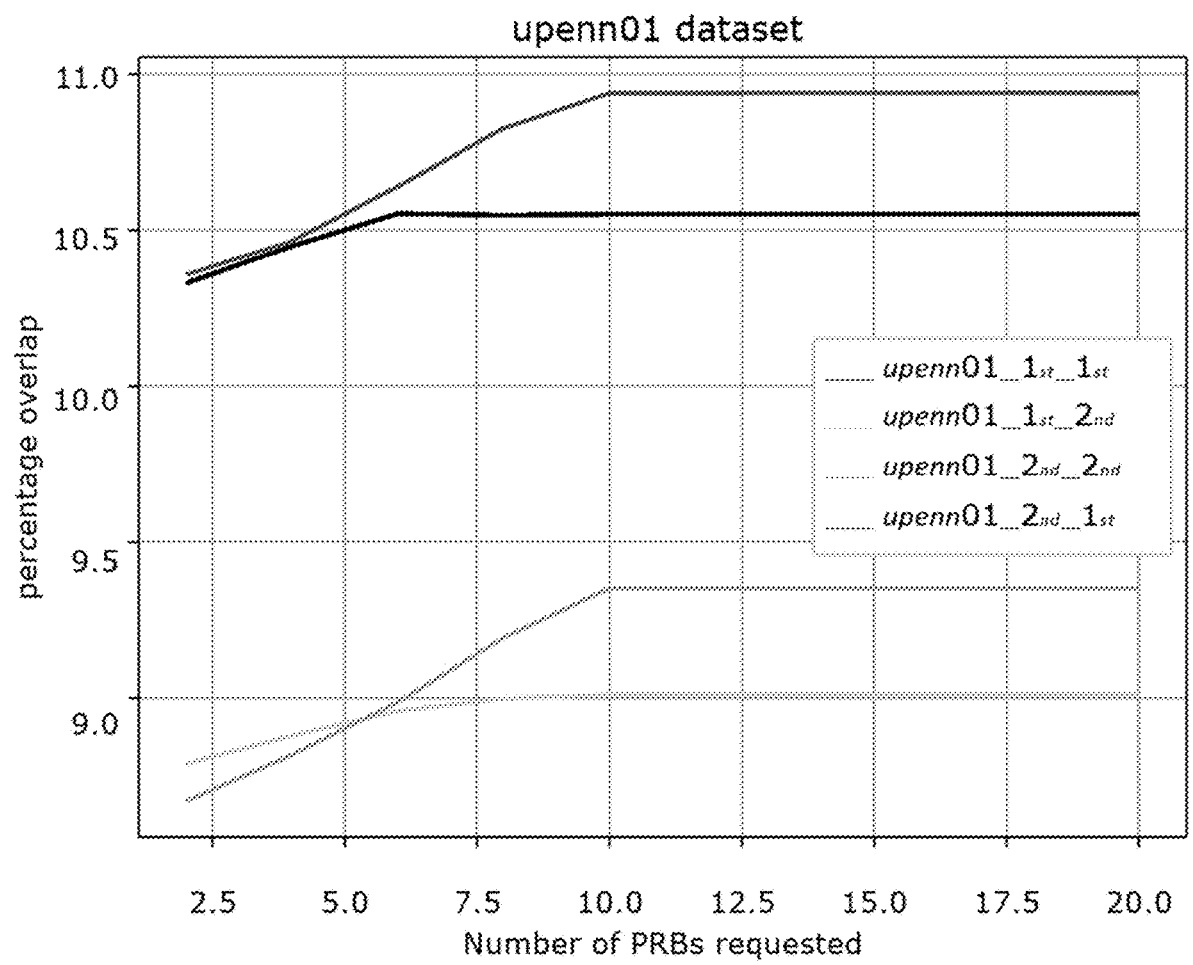
FIG. 22 shows a percentage overlap versus number of requested PRBs for upenn01 dataset running process fixed_PRB.

Performance of the process in terms of POST as the requested number of PRBs increases is shown for the lab and upenn01 datasets in FIG. 21 and FIG. 22. Overall, the POST values are low. Similar to WSU and PoI, the saturated values match with those of Process Max_PRB.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix(es) as used herein is intended to include both the singular and the plural of the term that it modifies, thereby including at least one of that term (e.g., the colorant(s) includes at least one colorants). Optional or optionally means that the subsequently described event or circumstance can or cannot occur, and that the description includes instances where the event occurs and instances where it does not. As used herein, combination is inclusive of blends, mixtures, alloys, reaction products, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms a and an and the and similar referents in the context of describing the invention (especially in the context of the following claims) are to be construed to cover both the singular and the plural, unless otherwise indicated herein or clearly contradicted by context. Or means and/or. It can further be noted that the terms first, second, primary, secondary, and the like herein do not denote any order, quantity, or importance, but rather are used to distinguish one element from another. The modifier about used in connection with a quantity is inclusive of the stated value and has the meaning dictated by the context (e.g., it includes the degree of error associated with measurement of the quantity). The conjunction or is used to link objects of a list or alternatives and is not disjunctive; rather the elements can be used separately or can be combined under appropriate circumstances.

What is claimed is:

1. A process for dynamically controlling allocation of physical resource blocks with a dynamic physical resource block controller, the process comprising:

monitoring, by the dynamic spectrum arbitrage controller, spectrum occupancy activity of a primary user over LTE wireless channels, the dynamic spectrum arbitrage controller being in communication with a secondary user that has a lower priority access to the LTE wireless channels than the primary user;

sending, by the secondary user, a PRB allocation request to the dynamic spectrum arbitrage controller when the secondary user has secondary user data to send;

acquiring, by the dynamic spectrum arbitrage controller, a status of the LTE wireless channels; request to the LTE wireless channels, such that the status comprises which of the LTE wireless channels are busy and which of the LTE wireless channels are idle;

performing, by the dynamic spectrum arbitrage controller, a process for optimal dynamic spectrum arbitrage after receiving the status of response from the LTE wireless channels and in response to receiving the PRB allocation request from the secondary user;

producing, by the dynamic spectrum arbitrage controller, a PRB map from performing the process for optimal dynamic spectrum arbitrage;

returning, by the dynamic spectrum arbitrage controller, the PRB map to the secondary user in response to the PRB allocation request; and transmitting, by the secondary user, secondary user data over the LTE wireless channels in accordance with the PRB map from the dynamic spectrum arbitrage controller to dynamically control allocation of physical resource blocks with the dynamic physical resource block control apparatus.

2. The process for dynamically controlling allocation of a physical resource block of claim 1, further comprising:

building, by a hazard function determiner of the dynamic spectrum arbitrage controller, a non-parametric cumulative hazard function, wherein the non-parametric cumulative hazard function built from idle time durations for each of the LTE wireless channels;

waiting, by a timer of the dynamic spectrum arbitrage controller, for the secondary user to make a PRB allocation request to the dynamic spectrum arbitrage controller via the control communicator;

sending, by a control communicator of the dynamic spectrum arbitrage controller, a request receive signal to the timer, the request receive signal being produced by the control communicator upon receipt of the PRB allocation request from the secondary user;

terminating waiting by the timer in response to receiving the request receive signal from the control communicator;

sending, by the timer, the non-parametric cumulative hazard function to a PRB mapper of the dynamic spectrum arbitrage controller after terminating the waiting by the timer;

running, by the PRB mapper, a process for optimal dynamic spectrum arbitrage;

outputting, by the PRB mapper, the PRB map as a result of running the process for optimal dynamic spectrum arbitrage; and sending, by the dynamic spectrum arbitrage controller, the PRB map to the secondary user.

3. The process for dynamically controlling allocation of a physical resource block of claim 2, wherein the process for optimal dynamic spectrum arbitrage comprises:

setting, at a time $t_{request}$ when the dynamic spectrum arbitrage controller receives the PRB allocation request from the secondary user, to zero a number $x_i$ of the physical resource blocks for each of the LTE wireless channels that is idle so that $x_i=0$;

determining a change $\Delta H_i$ in the non-parametric cumulative hazard function for each LTE wireless channels that is idle as: $\Delta H_i = H_i(t_i + x_i + 1) - H(t_i)$;

setting a global minimum $\Delta H_{min}$ of the change $\Delta H_i$ in the non-parametric cumulative hazard function to the minimum for the changes in the non-parametric cumulative hazard function for each LTE wireless channels that is idle as $$\Delta H_{min} = \min_{i}(\Delta H_i);$$

selecting, as a target LTE wireless channel m, the LTE wireless channel from among the LTE wireless channels that are idle for which $\Delta H_m = \Delta H_{min}$;

determining if $\Delta H_{min} < (-\ln(p))$, wherein p is a threshold probability of a successful transmission;

allocating, to the secondary user for sending the secondary user data, an additional physical resource block of the target LTE wireless channel m if $\Delta H_{min} < (-\ln(p))$; and sending, if $\Delta H_{min} \geq (-\ln(p))$, the PRB map from the dynamic spectrum arbitrage controller to the secondary user, wherein the PRB map comprises the number $x_i$ of the physical resource blocks allocated from each of the LTE wireless channels from time $t_{request}$.

* * * * *